United States Patent
Zhang

(10) Patent No.: US 11,481,428 B2
(45) Date of Patent: Oct. 25, 2022

(54) BULLET SCREEN CONTENT PROCESSING METHOD, APPLICATION SERVER, AND USER TERMINAL

(71) Applicant: TENCENT TECHNOLOGY (SHENZHEN) COMPANY LIMITED, Shenzhen (CN)

(72) Inventor: Congxi Zhang, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 1198 days.

(21) Appl. No.: 15/980,960

(22) Filed: May 16, 2018

(65) Prior Publication Data
US 2018/0267970 A1    Sep. 20, 2018

Related U.S. Application Data

(63) Continuation of application No. PCT/CN2017/087019, filed on Jun. 2, 2017.

(30) Foreign Application Priority Data

Jun. 3, 2016    (CN) .......................... 201610392746.0

(51) Int. Cl.
*G06F 16/48*    (2019.01)
*G06F 16/438*    (2019.01)
(Continued)

(52) U.S. Cl.
CPC ............ *G06F 16/48* (2019.01); *G06F 16/438* (2019.01); *G06F 40/205* (2020.01);
(Continued)

(58) Field of Classification Search
None
See application file for complete search history.

(56) References Cited

U.S. PATENT DOCUMENTS

| 10,171,522 B1 * | 1/2019 | Liu ........................ H04L 65/401 |
| 2013/0031505 A1 * | 1/2013 | Millington ............ G06F 3/0233 |
| | | 715/780 |

(Continued)

FOREIGN PATENT DOCUMENTS

| CN | 104462375 A | * | 3/2015 | ............. G06F 16/48 |
| CN | 104462375 A | | 3/2015 | |

(Continued)

OTHER PUBLICATIONS

Office Action dated May 5, 2021 in Indian Patent Application No. 201847019430, with concise English translation.
(Continued)

*Primary Examiner* — Ariel Mercado
(74) *Attorney, Agent, or Firm* — ArentFox Schiff LLP

(57) ABSTRACT

A bullet screen content processing method is described. Bullet screen content from a user terminal in association with currently played multimedia data is obtained. A content annotation corresponding to the bullet screen content is obtained by parsing the bullet screen content, where the content annotation includes at least one keyword segment corresponding to the bullet screen content. Label information corresponding to the content annotation is searched. The bullet screen content and the label information are added to a bullet screen data stream that is output in association with the multimedia data.

20 Claims, 10 Drawing Sheets

(51) Int. Cl.
*H04N 21/81* (2011.01)
*H04N 21/472* (2011.01)
*H04N 21/431* (2011.01)
*H04N 21/4722* (2011.01)
*G06F 40/30* (2020.01)
*G06F 40/205* (2020.01)
*G06F 40/284* (2020.01)

(52) U.S. Cl.
CPC ............ *G06F 40/284* (2020.01); *G06F 40/30* (2020.01); *H04N 21/4316* (2013.01); *H04N 21/4722* (2013.01); *H04N 21/47217* (2013.01); *H04N 21/8133* (2013.01)

(56) References Cited

U.S. PATENT DOCUMENTS

| | | | | |
|---|---|---|---|---|
| 2013/0111348 | A1* | 5/2013 | Gruber | G06F 40/279 715/727 |
| 2014/0201178 | A1 | 7/2014 | Baecke et al. | |
| 2014/0325557 | A1* | 10/2014 | Evans | H04N 21/458 725/32 |
| 2014/0344853 | A1* | 11/2014 | Maruyama | H04N 21/8583 725/32 |
| 2016/0277328 | A1* | 9/2016 | Ishizuka | G06F 3/0485 |

FOREIGN PATENT DOCUMENTS

| | | |
|---|---|---|
| CN | 104462495 A | 3/2015 |
| CN | 104811816 A | 7/2015 |
| CN | 105162876 A | 12/2015 |
| CN | 105435453 A | 3/2016 |
| CN | 105578222 A | 5/2016 |
| CN | 106101747 A | 11/2016 |
| WO | WO2014040169 A1 | 3/2014 |

OTHER PUBLICATIONS

Chinese Office Action dated Apr. 26, 2018 in Chinese Patent Application No. 201610392746.0 (with partial English translation), 9 pages.

International Search Report dated Aug. 1, 2017 issued in PCT/CN2017/087019 (with English translation), 5 pages.

Chinese Office Action dated Oct. 24, 2018 issued in Chinese Application No. 2016103927460, 10 pages.

* cited by examiner

BULLET SCREEN CONTENT PROCESSING METHOD, APPLICATION SERVER, AND USER TERMINAL

RELATED APPLICATION

This application is a continuation of International Application No. PCT/CN2017/087019, filed on Jun. 2, 2017, which claims priority to China Patent Application No. 201610392746.0, filed with the Chinese Patent Office on Jun. 3, 2016 and entitled "BULLET SCREEN CONTENT PROCESSING METHOD, APPLICATION SERVER, AND USER TERMINAL". The entire disclosures of the prior applications are hereby incorporated by reference in their entirety.

FIELD OF THE TECHNOLOGY

This application relates to a bullet screen content processing method, a server, and a user terminal.

BACKGROUND OF THE DISCLOSURE

With the continuous development and improvement of computer technologies, user terminals such as mobile phones and tablet computers have become an indispensable part of people's lives. People can use the user terminals for not only communications but also file transmission, photographing, gaming, and so on.

When using user terminals such as mobile phones and tablet computers to browse or play multimedia data, for example, watching videos, users usually have questions about data content (such as characters, nouns, and events) in the currently played multimedia data. However, such a querying process requires a user to suspend playing the multimedia data and switch to another search application to search for information regarding the questions about the data content, which affects playing efficiency and a user experience of playing the multimedia data.

SUMMARY

Embodiments of this application provide a bullet screen content processing method, a server (e.g. application server), and a user terminal, to ensure playing efficiency of multimedia data and improve a user experience of playing the multimedia data.

Aspects of the disclosure provide a bullet screen content processing method. Bullet screen content from a user terminal in association with currently played multimedia data is obtained. A content annotation corresponding to the bullet screen content is obtained by parsing the bullet screen content, where the content annotation includes at least one keyword segment corresponding to the bullet screen content. Label information corresponding to the content annotation is searched. The bullet screen content and the label information is added, by circuitry, to a bullet screen data stream that is output in association with the multimedia data.

In an embodiment, for obtaining the content annotation corresponding to the bullet screen content by parsing the bullet screen content, word segmentation processing is performed on the bullet screen content, and at least one character combination of the bullet screen content is obtained according to the word segmentation processing. Also, semantic recognition processing is performed on the at least one character combination, and the at least one keyword segment corresponding to the bullet screen content is determined according to the semantic recognition processing.

In an embodiment, the word segmentation processing is performed by using a preset lexicon, and the determining the at least one keyword segment corresponding to the bullet screen content is performed based on a preset term attribute and a segment context.

In an embodiment, for searching for the label information corresponding to the content annotation, the label information corresponding to the at least one keyword segment is searched according to the at least one keyword segment that corresponds to the bullet screen content and is included in the content annotation.

In an embodiment, for searching for the label information corresponding to the content annotation, whether there is preset label information corresponding to the at least one keyword segment is detected according to the at least one keyword segment that corresponds to the bullet screen content and is included in the content annotation, and a label information searching request including the at least one keyword segment is sent to a searching device when there is no preset label information corresponding to the at least one keyword segment, causing the searching device to output a search result corresponding to the at least one keyword segment. Also, the search result corresponding to the at least one keyword segment from the searching device is obtained, and the label information corresponding to the content annotation is extracted from the search result.

In an embodiment, for adding the bullet screen content and the label information to the bullet screen data stream that is output in association with the multimedia data, a result link corresponding to the search result is generated, and response information corresponding to the bullet screen content is generated according to the result link and the label information. Also, the bullet screen content and the response information are added to the bullet screen data stream that is output in association with the multimedia data.

In an embodiment, a request from the user terminal for displaying the search result is obtained, when a triggering operation for the result link is detected. The search result is encapsulated by using a preset display format, and an encapsulated search result is sent to the user terminal, causing the user terminal to display the encapsulated search result.

In an embodiment, the preset display format includes a display format with a hovering, semitransparent attribute.

Aspects of the disclosure provide a non-transitory computer-readable storage medium storing computer-readable instructions, the computer-readable instructions, when executed by one or more processors, causing the one or more processors to perform at least the operations described herein. Bullet screen content that is input in association with currently played multimedia data is obtained. The bullet screen content is sent to an application server, causing the application server to obtain a content annotation corresponding to the bullet screen content by parsing the bullet screen content and search for label information corresponding to the content annotation, where the content annotation includes at least one keyword segment corresponding to the bullet screen content. A bullet screen data stream from the application server in association with the multimedia data is received, the bullet screen data stream including the bullet screen content and the label information.

In an embodiment, the bullet screen data stream that is received from the application server includes the bullet screen content and response information, and the response information includes the label information and a result link corresponding to a search result, the search result being a result obtained by the application server by searching for the at least one keyword segment included in the content annotation, and the search result including the label information.

In an embodiment, a request for displaying the search result is sent to the application server when a triggering operation for the result link is received, causing the application server to encapsulate the search result by using a preset display format. An encapsulated search result from the application server is received, and the encapsulated search result is displayed. The preset display format includes a display format with a hovering, semitransparent attribute.

Aspects of the disclosure provide an application server that includes a memory and at least one processor. The memory is configured to store a content processing application program. The at least one processor is configured to execute the content processing application program to perform at least the following operations. For example, bullet screen content from a user terminal in association with currently played multimedia data is obtained. A content annotation corresponding to the bullet screen content is obtained by parsing the bullet screen content, where the content annotation includes at least one keyword segment corresponding to the bullet screen content. Label information corresponding to the content annotation is searched. Also, the bullet screen content and the label information are added to a bullet screen data stream that is output in association with the multimedia data.

In an embodiment, the at least one processor is configured to execute the content processing application program to perform at least the following operations. For example, word segmentation processing is performed on the bullet screen content, and at least one character combination of the bullet screen content is obtained according to the word segmentation processing. Also, semantic recognition processing is performed on the at least one character combination, and the at least one keyword segment corresponding to the bullet screen content is determined according to the semantic recognition processing.

In an embodiment, the word segmentation processing is performed by using a preset lexicon, and the determining the at least one keyword segment corresponding to the bullet screen content is performed based on a preset term attribute and a segment context.

In an embodiment, the at least one processor is configured to execute the content processing application program to perform at least the following operations. For example, the label information corresponding to the at least one keyword segment is searched according to the at least one keyword segment that corresponds to the bullet screen content and is included in the content annotation.

In an embodiment, the at least one processor is configured to execute the content processing application program to perform at least the following operations. For example, whether there is preset label information corresponding to the at least one keyword segment is detected according to the at least one keyword segment that corresponds to the bullet screen content and is included in the content annotation. A label information searching request including the at least one keyword segment is sent to a searching device when there is no preset label information corresponding to the at least one keyword segment, causing the searching device to look for a search result corresponding to the at least one keyword segment. The search result corresponding to the at least one keyword segment from the searching device is obtained, and the label information corresponding to the at least one keyword segment is extracted from the search result.

In an embodiment, the at least one processor is configured to execute the content processing application program to perform at least the following operations. For example, a result link corresponding to the search result is generated, and response information corresponding to the bullet screen content is generated according to the result link and the label information. The bullet screen content and the response information is to the bullet screen data stream that is output in association with the multimedia data.

In an embodiment, the at least one processor is configured to execute the content processing application program to perform at least the following operations. For example, a request from the user terminal for displaying the search result is obtained, when a triggering operation for the result link is detected. The search result is encapsulated by using a preset display format, and an encapsulated search result is sent to the user terminal, causing the user terminal to display the encapsulated search result.

In an embodiment, the preset display format includes a display format with a hovering, semitransparent attribute.

Aspects of the disclosure provide a user terminal that includes a memory and at least one processor. The memory is configured to store a content processing application program. The at least one processor is configured to execute the content processing application program to perform at least the following operations. For example, bullet screen content that is input in association with currently played multimedia data is obtained. The bullet screen content is sent to an application server, causing the application server to obtain a content annotation corresponding to the bullet screen content by parsing the bullet screen content and search for label information corresponding to the content annotation, where the content annotation includes at least one keyword segment corresponding to the bullet screen content. A bullet screen data stream from the application server in association with the multimedia data is received, the bullet screen data stream including the bullet screen content and the label information.

In an embodiment, the bullet screen data stream that is received from the application server includes the bullet screen content and response information, and the response information includes the label information and a result link corresponding to a search result, the search result being a result obtained by the application server by searching for the at least one keyword segment included in the content annotation, and the search result including the label information.

In an embodiment, the at least one processor is configured to further perform at least the following operations. For example, a request for displaying the search result is sent to the application server when a triggering operation for the result link is received, causing the application server to encapsulate the search result by using a preset display format. The encapsulated search result from the application server is received, and the encapsulated search result is displayed. The preset display format includes a display format with a hovering, semitransparent attribute.

BRIEF DESCRIPTION OF THE DRAWINGS

The following briefly describes the accompanying drawings for describing various embodiments. These drawings only show exemplary embodiments of this application, and a person of ordinary skill in the art may still derive other variations from these accompanying drawings.

DESCRIPTION OF EMBODIMENTS

The following describes exemplary embodiments of this application with reference to the accompanying drawings. The described embodiments are merely a part rather than all of the embodiments of this application. All other embodiments obtained by a person of ordinary skill in the art based on the embodiments of this application shall fall within the protection scope of this application.

A bullet screen content processing method provided in the embodiments of this application is applicable to a multimedia data playing scenario that supports a bullet screen function, for example, a scenario in which an application server obtains a request sent by a user terminal for displaying bullet screen content in association with currently played multimedia data; the application server obtains a content annotation corresponding to the bullet screen content by parsing the bullet screen content; the application server searches for label information corresponding to the content annotation; and the application server adds the bullet screen content and the label information to a bullet screen data stream that is output in association with the multimedia data. By parsing the bullet screen content and searching for and outputting the associated label information, a search for data content is completed without interrupting the currently played multimedia data, ensuring playing efficiency of the multimedia data and improving a user experience of playing the multimedia data. In addition, an automatic response to the bullet screen content is implemented, enriching presentation content of the multimedia data.

The application server in the embodiments of this application may be a backend server of a multimedia data playing application. In some examples, the application server is a server having functions such as multimedia data stream pushing and bullet screen data stream pushing. The user terminal may include a tablet computer, a smart phone, a personal computer (PC), a palmtop computer, a mobile Internet device (MID), and other terminal devices having a multimedia data playing function. The multimedia data may include a video, an image, music, and so on.

A bullet screen content processing method provided in the embodiments of this application will be described in detail below with reference to FIG. 1 to FIG. 7.

Figure 1:
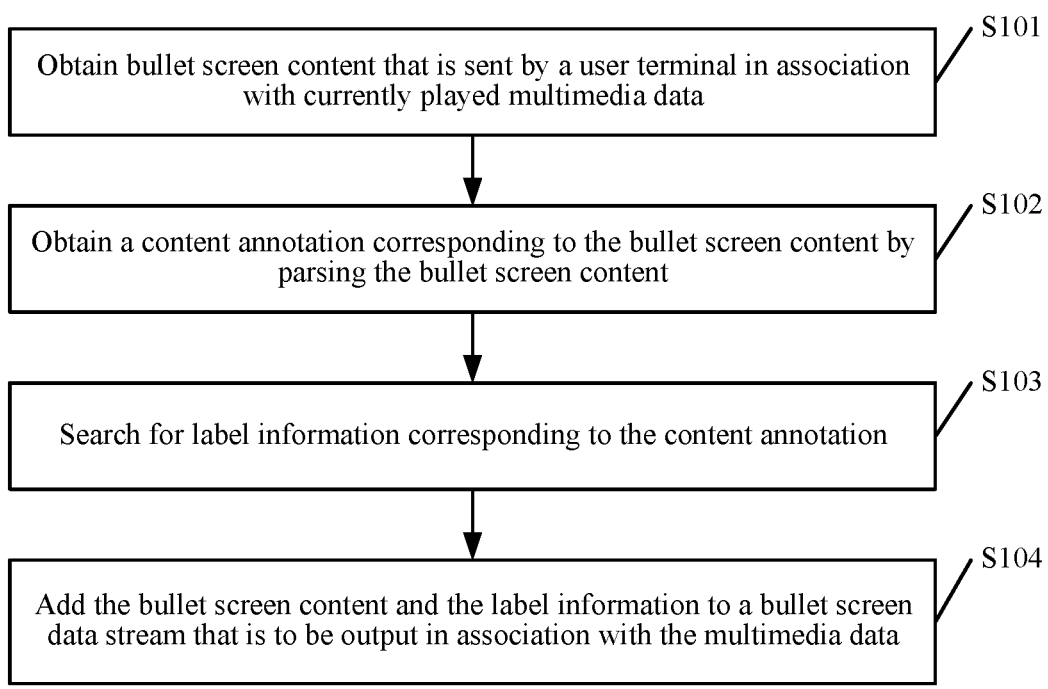
FIG. 1 is a flowchart of a bullet screen content processing method according to an embodiment of this application.

Referring to FIG. 1, FIG. 1 is a flowchart of a bullet screen content processing method according to an embodiment of this application. As shown in FIG. 1, the method in this embodiment of this application may include step S101 to step S104 as follows.

S101: Obtain bullet screen content that is sent by a user terminal in association with currently played multimedia data.

Specifically, the application server may obtain bullet screen content that is sent by a user terminal and that is input for currently played multimedia data. It can be understood that, when the user terminal plays the multimedia data, a user may input, in a bullet screen content input box provided by a graphical user interface of the user terminal, bullet screen content to be used in a bullet screen service. The user terminal may send the bullet screen content to the application server, so as to request the application server to add the bullet screen content to a bullet screen data stream that is in association with the currently played multimedia data. The application server may obtain the request of the user terminal for displaying the bullet screen content, and obtain the bullet screen content included in the display request.

It should be noted that, the user may register an application identifier, such as an application account, of a corresponding multimedia data playing application with the application server in advance, and may use the application identifier to log into the multimedia data playing application in the user terminal. After logging in successfully, the user may request to-be-played multimedia data from the application server.

S102: Obtain a content annotation corresponding to the bullet screen content by parsing the bullet screen content.

Specifically, the application server may parse the bullet screen content. The parsing may include word segmentation processing and semantic recognition processing on the bullet screen content. The application server obtains content annotation corresponding to the bullet screen content according to the parsing. The content annotation may include at least one keyword segment corresponding to the bullet screen content. In some examples, the application server may perform word segmentation processing on the bullet screen content, obtain at least one character combination of the bullet screen content according to the word segmentation processing, perform semantic recognition processing on the at least one character combination, and determine at least one keyword segment corresponding to the bullet screen content according to the semantic recognition processing.

S103: Search for label information corresponding to the content annotation.

Specifically, the application server may search for label information corresponding to the content annotation. The label information may be a brief description associated with the bullet screen content. The label information corresponding to the content annotation may be preset before the search process. When obtaining the content annotation corresponding to the bullet screen content, the application server may find the label information according to the content annotation.

In some examples, the application server may search, according to at least one keyword segment that is corresponding to the bullet screen content and included in the content annotation, label information corresponding to the at least one keyword segment. Further, the application server detects, according to at least one keyword segment that is corresponding to the bullet screen content and included in the content annotation, whether there is preset label information corresponding to the at least one keyword segment. When detecting that there is preset label information corresponding to the at least one keyword segment, the application server may obtain the preset label information without further requesting for a label information search. When detecting that there is no preset label information corresponding to the at least one keyword segment, the application server may send a label information searching request including the keyword segment to a searching device. It should be noted that, the searching device may be a search engine in the application server, or may be a search server independent of the application server. The searching device may obtain the at least one keyword segment, and output a search result corresponding to the at least one keyword segment. The search result may be a detailed description associated with the bullet screen content. The searching device may send the search result to the application server. The application server obtains the search result corresponding to the at least one keyword segment sent by the searching device, and extracts the label information corresponding to the content annotation from the search result.

S104: Add the bullet screen content and the label information to a bullet screen data stream that is output in association with the multimedia data. The application server outputs the bullet screen data stream to the user terminal, and the user terminal displays the bullet screen data stream along with the multimedia data.

Specifically, the application server may add the bullet screen content and the label information to a bullet screen data stream that is output in association with the multimedia data. Further, the application server may generate a result link corresponding to the search result, and generate response information corresponding to the bullet screen content according to the result link and the label information. The application server adds the bullet screen content and the response information to the bullet screen data stream that is output in association with the multimedia data.

In this embodiment of this application, bullet screen content in association with currently played multimedia data is obtained, the bullet screen content is parsed to obtain a corresponding content annotation, label information corresponding to the content annotation is searched for, and the bullet screen content and the label information are output in a bullet screen manner. By parsing the bullet screen content and searching for and outputting the associated label information, a search for data content is completed without interrupting the currently played multimedia data, ensuring playing efficiency of the multimedia data and improving a user experience of playing the multimedia data. In addition, an automatic response to the bullet screen content is implemented, enriching presentation content of the multimedia data.

Figure 2:
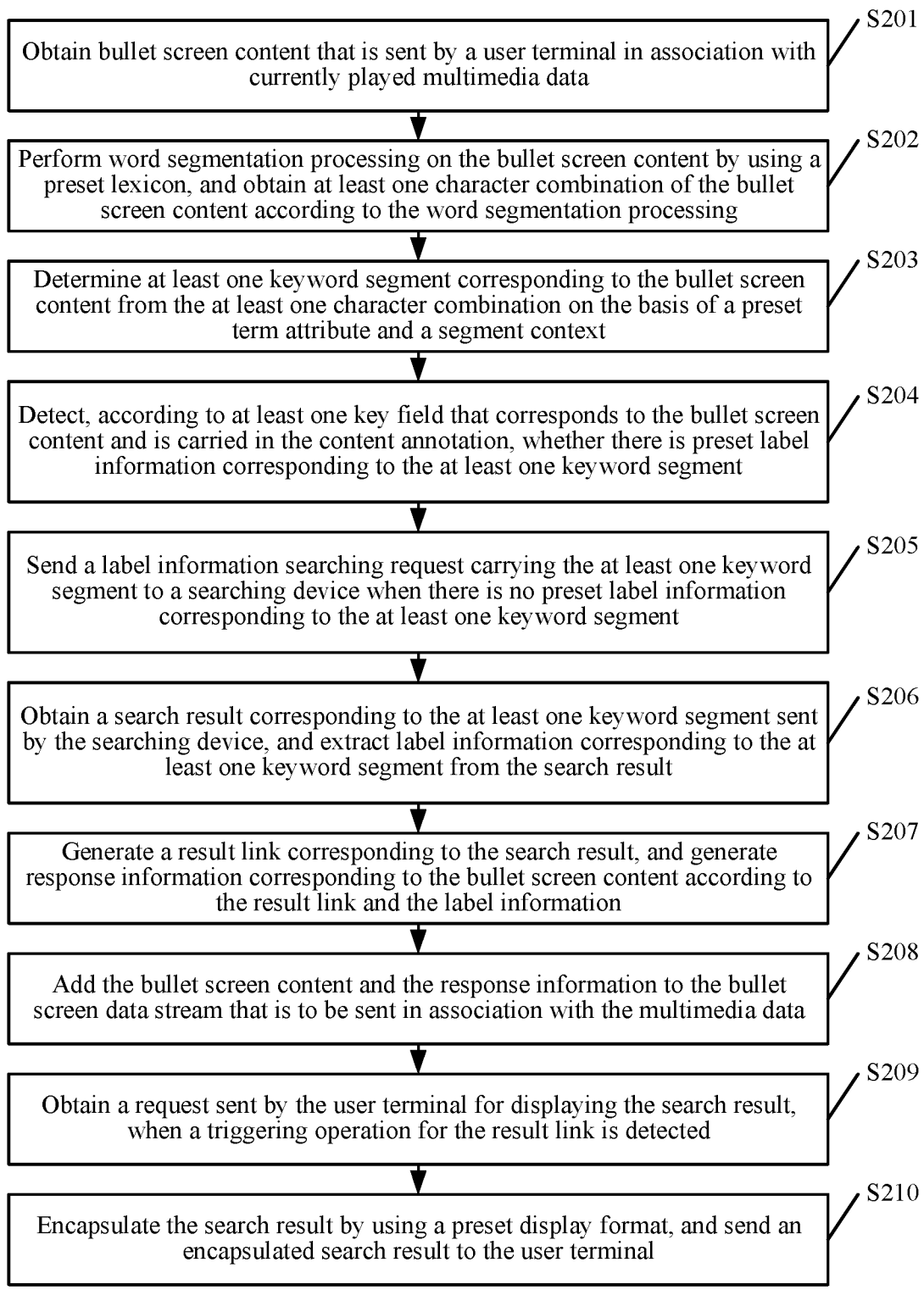
FIG. 2 is a flowchart of another bullet screen content processing method according to an embodiment of this application.

Referring to FIG. 2, FIG. 2 is a flowchart of another bullet screen content processing method according to an embodiment of this application. As shown in FIG. 2, the method in this embodiment of this application may include step S201 to step S210 as follows.

S201: Obtain bullet screen content that is sent by a user terminal in association with currently played multimedia data.

Specifically, the application server may obtain bullet screen content that is sent by a user terminal and that is input for currently played multimedia data. It can be understood that, when the user terminal plays the multimedia data, a user may input, in a bullet screen content input box provided by a graphical user interface of the user terminal, bullet screen content to be used in a bullet screen service. The user terminal may send the bullet screen content to the application server, so as to request the application server to add the bullet screen content to a bullet screen data stream that is in association with the currently played multimedia data. The application server may obtain the request of the user terminal for displaying the bullet screen content, and obtain the bullet screen content included in the display request.

Figure 3:
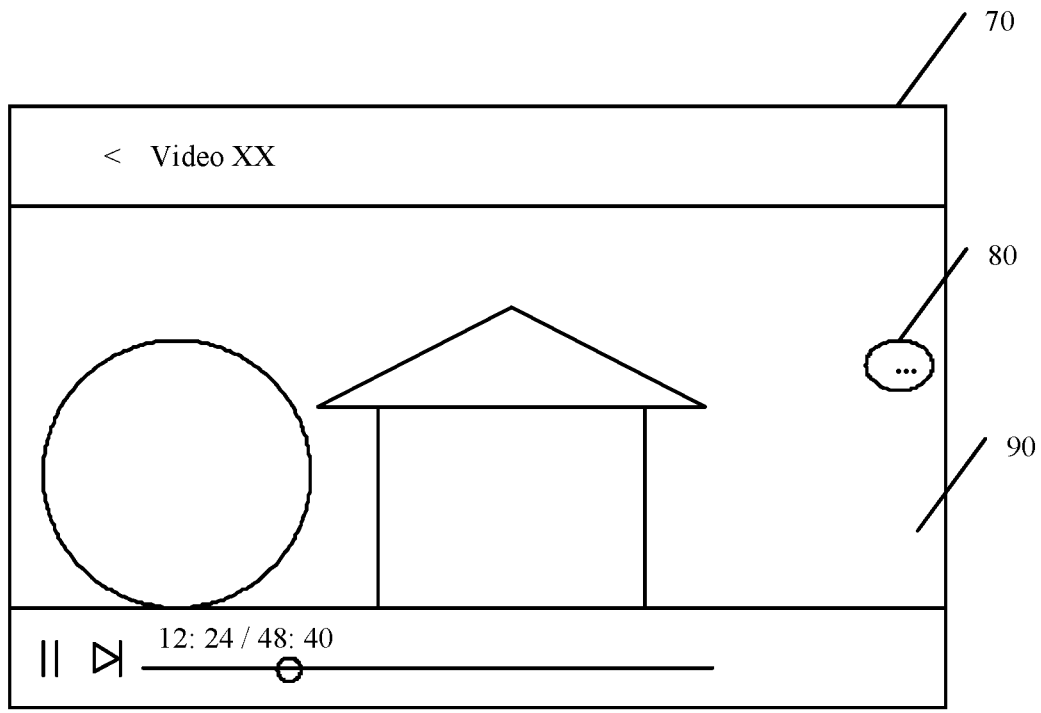
FIG. 3 is a screen view showing a type of bullet screen content processing according to an embodiment of this application.

Referring to FIG. 3, which is a screen view showing a type of bullet screen content processing according to an embodiment of this application. As shown in FIG. 3, when a display screen 70 of the user terminal plays a video of multimedia data XX, a bullet screen button 80 may be displayed at a preset position of a playing interface 90, such as at a right edge of the playing interface 90 shown in FIG. 3. A user may move a cursor or use a finger, a stylus, or the like to click the bullet screen button 80 in order to activate a bullet screen service. In this case, the user terminal may display a bullet screen content input box, so that the user can input bullet screen content to be used in the bullet screen service.

It should be noted that, the user may register an application identifier, such as an application account, of a corresponding multimedia data playing application with the application server in advance, and may use the application identifier to log into the multimedia data playing application in the user terminal. After logging in successfully, the user may request to-be-played multimedia data from the application server.

S202: Perform word segmentation processing on the bullet screen content by using a preset lexicon, and obtain at least one character combination of the bullet screen content according to the word segmentation processing.

Specifically, the application server may perform word segmentation processing on the bullet screen content. A corresponding lexicon may be preset in the application server. The application server may perform word segmentation processing on the bullet screen content by using the preset lexicon, and obtain at least one character combination of the bullet screen content according to a result of the word segmentation processing. For example, the bullet screen content is "who is AA", and the character terms of key segments of "A", "AA", "is AA", "is A", "who is" and so on are obtained according to a result of performing the word segmentation processing. The application server may screen out at least one character combination of the bullet screen content by using the preset lexicon. For example, it is obtained through matching in the preset lexicon that "A", "AA", and "who is" are complete terms, and at least one character combination of "A", "AA", and "who is" is obtained.

S203: Determine at least one keyword segment corresponding to the bullet screen content from the at least one character combination on the basis of a preset term attribute and a segment context.

Specifically, the application server may determine at least one keyword segment corresponding to the bullet screen content from the at least one character combination on the basis of a preset term attribute and a segment context. For example, the at least one character combination corresponding to the bullet screen content "who is AA" includes "A", "AA", and "who is". It is obtained that the preset term attributes of "A" and "AA" are common character terms, and the preset term attribute of "who is" is a term expressing a query. The presence of the character term "AA" after "who is" represents the meaning of a query about the character term "AA". Therefore, it is determined that the at least one keyword segment is "AA" and "who is".

S204: Detect, according to at least one keyword segment that corresponds to the bullet screen content and is included in the content annotation, whether there is preset label information corresponding to the at least one keyword segment.

Specifically, the application server may detect, according to at least one keyword segment that corresponds to the bullet screen content and is included in the content annotation, whether there is preset label information corresponding to the at least one keyword segment. It can be understood that, the application server may search for label information according to one or more keyword segments in the at least one keyword segment. The label information may be a brief description associated with the bullet screen content. The label information corresponding to the content annotation is preset before the search process. When obtaining at least one keyword segment corresponding to the bullet screen content, the application server may find the label information according to the at least one keyword segment.

S205: Send a label information searching request including the at least one keyword segment to a searching device when there is no preset label information corresponding to the at least one keyword segment, so that the searching device outputs a search result corresponding to the at least one keyword segment.

Specifically, when detecting that there is no preset label information corresponding to the at least one keyword segment, the application server may send a label information searching request including the keyword segment to a searching device. It should be noted that, the searching device may be a search engine in the application server, or may be a search server independent of the application server. The searching device may obtain the at least one keyword segment, and output a search result corresponding to the at least one keyword segment. The search result may be a detailed description associated with the bullet screen content. The searching device may send the search result to the application server.

In some examples, when detecting that there is preset label information corresponding to the at least one keyword segment, the application server may obtain the preset label information without further requesting for a label information search.

S206: Obtain the search result corresponding to the at least one keyword segment sent by the searching device, and extract label information corresponding to the content annotation from the search result.

Specifically, the application server obtains the search result corresponding to the at least one keyword segment sent by the searching device, and extracts label information corresponding to the content annotation from the search result. According to the foregoing example, by searching for "AA", the related search result obtained may be: "AA, with the courtesy name of MM and literary name of NN, is a general of state C in the era of BB, achieving the military exploits as follows", and so on. By means of extraction from the search result, corresponding label information such as "AA is a general of state C in the era of BB" is obtained.

S207: Generate a result link corresponding to the search result, and generate response information corresponding to the bullet screen content according to the result link and the label information.

S208: Add the bullet screen content and the response information to the bullet screen data stream that is output in association with the multimedia data. The application server outputs the bullet screen data stream to the user terminal, and the user terminal displays the bullet screen data stream along with the multimedia data.

Specifically, the application server may generate a result link corresponding to the search result, and generate response information corresponding to the bullet screen content according to the result link and the label information. The application server adds the bullet screen content and the response information to the bullet screen data stream that is output in association with the multimedia data. According to the foregoing example, a result link corresponding to the search result "AA, with the courtesy name of MM and literary name of NN, is a general of state C in the era of BB, achieving the military exploits as follows" may be generated, for example, a link "click to see more". The result link is combined with the label information "AA is a general of state C in the time of BB", to generate response information "AA is a general of state C in the time of BB. Click to see more." The response information is added to the bullet screen data stream that is output in association with the multimedia data.

Figure 4:
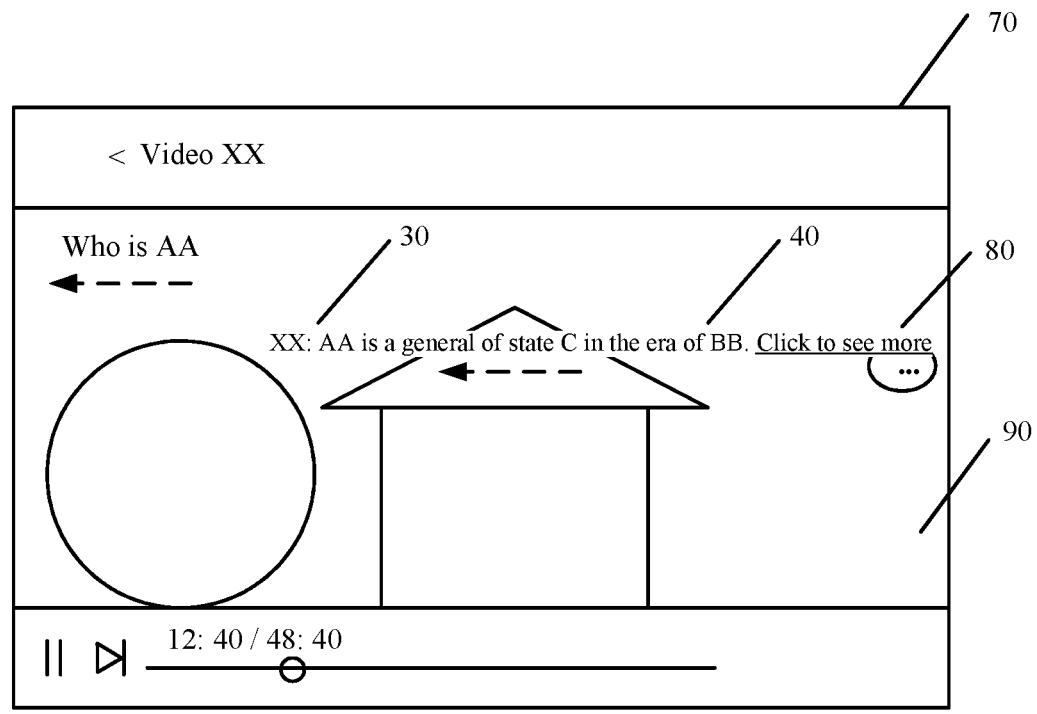
FIG. 4 is a screen view showing another type of bullet screen content processing according to an embodiment of this application.

Referring to FIG. 4, which is a screen view showing another type of bullet screen content processing according to an embodiment of this application. As shown in FIG. 4, the user terminal may display the bullet screen content and the response information in the playing interface 90, where "◄ − − −" is used for representing a movement direction of the bullet screen content and the response information in the playing interface 90. Also, the bullet screen content is "who is AA", and the response information may include label information 30 "AA is a general of state C in the era of BB" and a result link 40 "click to see more". In addition, the response information may further include a playing application identifier XX used for indicating that the current response information is automatic response information of a system.

In some examples, the application server may add only the bullet screen content to the bullet screen data stream that is output in association with the multimedia data, and send the response information to the user terminal corresponding to the application identifier for displaying. It can be understood that, data in the bullet screen data stream is obtained and displayed by all user terminals currently playing the multimedia data, while data sent according to the application identifier may only be obtained and displayed by the user terminal corresponding to the application identifier. Alternatively, when obtaining the bullet screen content sent by the user terminal, the application server may first add the bullet screen content to the bullet screen data stream to output the bullet screen content, and output the response information after the response information is generated.

S209: Obtain a request sent by the user terminal for displaying the search result, when a triggering operation for the result link is detected.

S210: Encapsulate the search result by using a preset display format, and send an encapsulated search result to the user terminal.

Specifically, when the user terminal detects a triggering operation for the result link, for example, when the user terminal detects a click operation for the result link, the user terminal may send, on the basis of the application identifier, a request for displaying the search result to the application server. The application server may obtain the request sent by the user terminal for displaying the search result. In some examples, the application server may encapsulate the search result by using a preset display format, and send an encapsulated search result to the user terminal corresponding to the application identifier. The user terminal displays the encapsulated search result. It should be noted that, in some examples, the preset display format is a display format with a hovering, semitransparent attribute.

Figure 5:
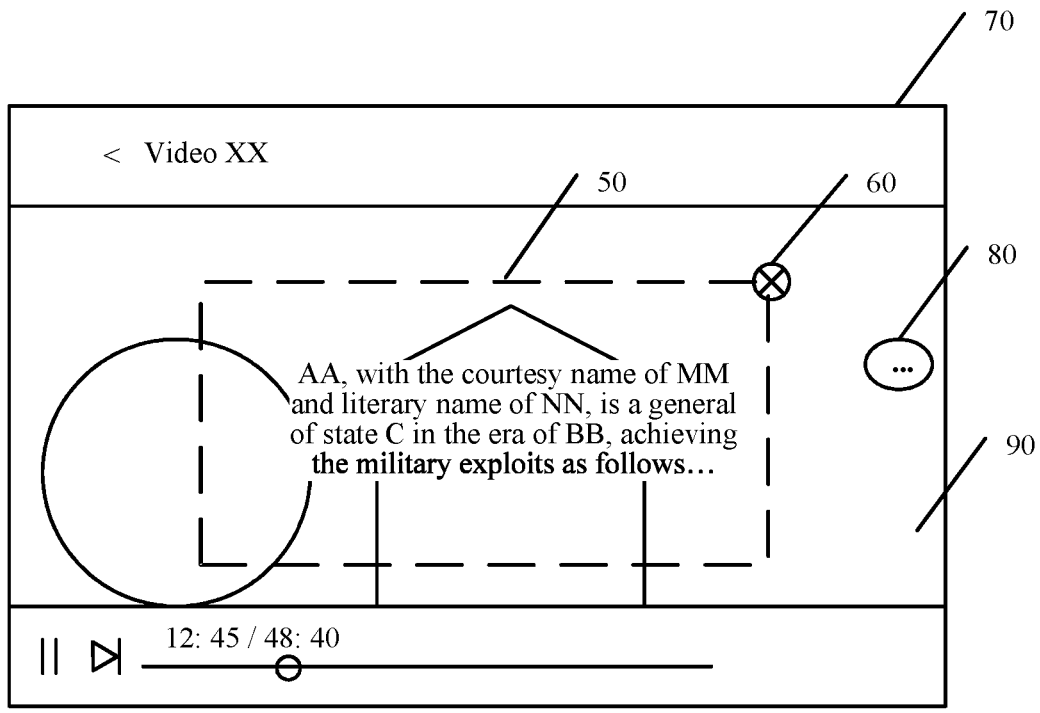
FIG. 5 is a screen view showing still another type of bullet screen content processing according to an embodiment of this application.

Referring to FIG. 5, which is a screen view showing still another type of bullet screen content processing according to an embodiment of this application. As shown in FIG. 5, the user terminal may display the encapsulated search result "AA, with the courtesy name of MM and literary name of NN, is a general of state C in the era of BB, achieving the military exploits as follows". A dashed block 50 in FIG. 5 is used for representing a display region of the encapsulated search result. After a user finishes browsing the encapsulated search result, the user closes the display region represented by dashed block 50 by clicking a close button 60 on the display region.

In this embodiment of this application, bullet screen content in association with currently played multimedia data is obtained, the bullet screen content is parsed to obtain a corresponding content annotation, label information corresponding to the content annotation is searched for, and the bullet screen content and the label information are output in a bullet screen manner. By parsing the bullet screen content and searching for and outputting the associated label information, a search for data content is completed without interrupting the currently played multimedia data, ensuring playing efficiency of the multimedia data and improving a user experience of playing the multimedia data. In addition, an automatic response to the bullet screen content is implemented, enriching presentation content of the multimedia data. By means of word segmentation processing and semantic recognition, the bullet screen content is parsed to further implement an automatic response to the bullet screen content. A display format with a hovering, semitransparent attribute allows a user to enjoy the multimedia data while browsing the search result, further improves the user experience of playing the multimedia data.

Figure 6:
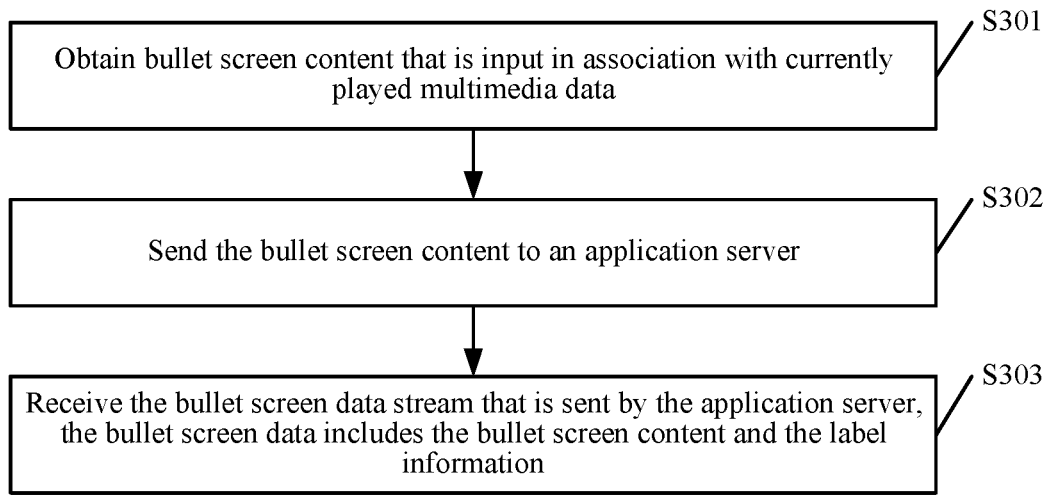
FIG. 6 is a flowchart of another bullet screen content processing method according to an embodiment of this application.

Referring to FIG. 6, FIG. 6 is a flowchart of another bullet screen content processing method according to an embodiment of this application. As shown in FIG. 6, the method in this embodiment of this application may include step S301 to step S303 as follows.

S301: Obtain bullet screen content that is input in association with currently played multimedia data.

Specifically, when a user terminal plays the multimedia data, a user may input, in a bullet screen content input box provided by a user interface of the user terminal, bullet screen content to be used in a bullet screen service. The user terminal may obtain the bullet screen content.

S302: Send the bullet screen content to an application server.

Specifically, the user terminal may send the bullet screen content to the application server, so as to request the application server to add the bullet screen content to a bullet screen data stream that is output by the application server in association with the multimedia data. The application server may obtain the request of the user terminal for displaying the bullet screen content, and obtain the bullet screen content included in the display request.

The application server may parse the bullet screen content. The parsing may include word segmentation processing and semantic recognition processing on the bullet screen content. The application server obtains content annotation corresponding to the bullet screen content according to the parsing. The content annotation may include at least one keyword segment corresponding to the bullet screen content. In some examples, the application server may perform word segmentation processing on the bullet screen content, obtain at least one character combination of the bullet screen content after the word segmentation processing, perform semantic recognition processing on the at least one character combination, and determine at least one keyword segment corresponding to the bullet screen content according to the semantic recognition processing.

The application server may search for label information corresponding to the content annotation. The label information may be a brief description associated with the bullet screen content. The label information corresponding to the content annotation is preset before the search process. When obtaining the content annotation corresponding to the bullet screen content, the application server may find the label information according to the content annotation.

The application server may add the bullet screen content and the label information to a bullet screen data stream that is output by the application server in association with the multimedia data, to output the bullet screen content and the label information.

S303: Receive the bullet screen data stream that is sent by the application server in association with the multimedia data, the bullet screen data stream including the bullet screen content and the label information.

Specifically, the user terminal may receive the bullet screen data stream that is sent by the application server and that includes the bullet screen content and the label information. For example, according to the received bullet screen data stream, the user terminal displays the bullet screen content and the label information in an image of the currently played multimedia data.

In this embodiment of this application, bullet screen content in association with currently played multimedia data is obtained, the bullet screen content is parsed to obtain a corresponding content annotation, label information corresponding to the content annotation is searched for, and the bullet screen content and the label information are finally output in a bullet screen manner. By parsing the bullet screen content and searching for and outputting the associated label information, a search for data content is completed without interrupting the currently played multimedia data, ensuring playing efficiency of the multimedia data and improving a user experience of playing the multimedia data. In addition, an automatic response to the bullet screen content is implemented, enriching presentation content of the multimedia data.

Figure 7:
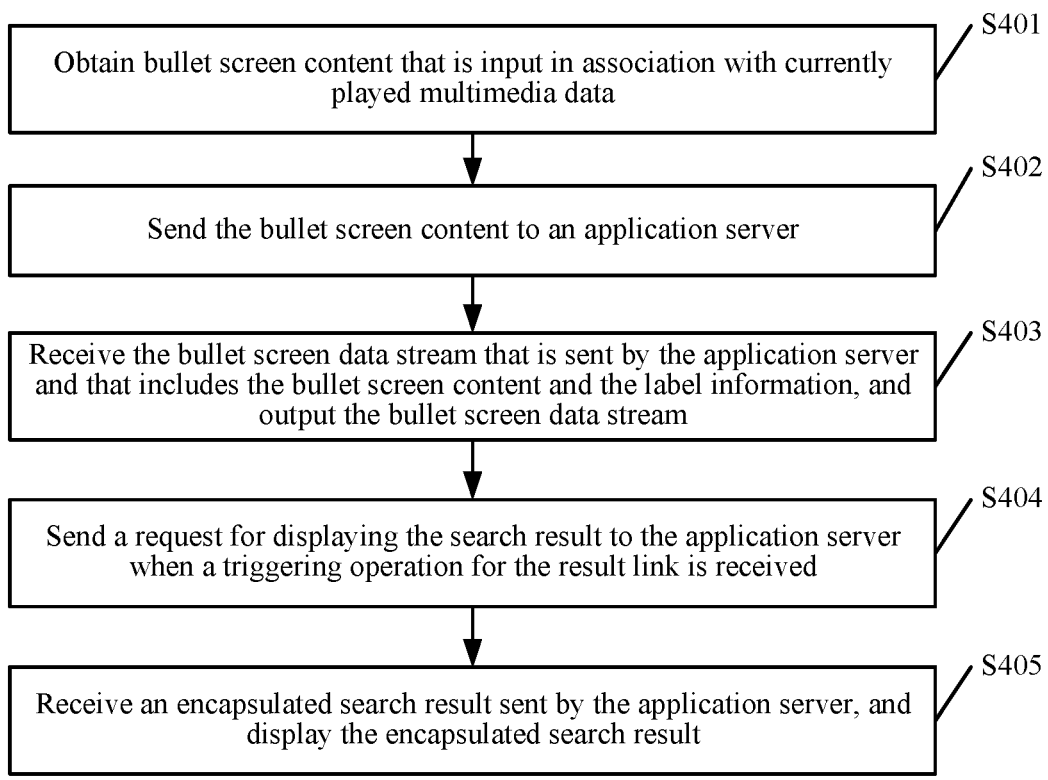
FIG. 7 is a s flowchart of another bullet screen content processing method according to an embodiment of this application.

Referring to FIG. 7, which is a flowchart of still another bullet screen content processing method according to an embodiment of this application. As shown in FIG. 7, the method of this embodiment of this application may include step S401 to step S405 as follows.

S401: Obtain bullet screen content that is input in association with currently played multimedia data.

Specifically, when a user terminal plays the multimedia data, a user may input, in a bullet screen content input box provided by a user interface of the user terminal, bullet screen content to be used in a bullet screen service. The user terminal may obtain the bullet screen content.

It should be noted that, the user may register an application identifier, such as an application account, of a corresponding multimedia data playing application with the application server in advance, and may use the application identifier to log into the multimedia data playing application in the user terminal. After logging in successfully, the user may request to-be-played multimedia data from the application server.

S402: Send the bullet screen content to an application server.

Specifically, the user terminal may send the bullet screen content to the application server, so as to request the application server to add the bullet screen content to a bullet screen data stream that is output by the application server in association with the multimedia data. The application server may obtain the request of the user terminal for displaying the bullet screen content, and obtain the bullet screen content included in the display request.

The application server may perform word segmentation processing on the bullet screen content. A corresponding lexicon may be preset in the application server. The application server may perform word segmentation processing on the bullet screen content by using the preset lexicon, and obtain at least one character combination of the bullet screen content according to a result of the word segmentation processing. For example, the bullet screen content is "who is AA", and the characters of "A", "AA", "is AA", "is A", "who is" and so on are obtained according to a result of performing the word segmentation processing. The application server may screen out at least one character combination of the bullet screen content by using the preset lexicon. For example, it is obtained through matching in the preset lexicon that "A", "AA", and "who is" are complete terms, and at least one character combination of "A", "AA", and "who is" is obtained. The application server may determine at least one keyword segment corresponding to the bullet screen content from the at least one character combination on the basis of a preset term attribute and a segment context. For example, the at least one character combination corresponding to the bullet screen content "who is AA" includes "A", "AA", and "who is". It is obtained that the preset term attributes of "A" and "AA" are common character terms, and the preset term attribute of "who is" is a term expressing a query. The presence of the character term "AA" after "who is" represents the meaning of a query about the character term "AA". Therefore, it is determined that the at least one keyword segment is "AA" and "who is".

The application server may detect, according to at least one keyword segment that corresponds to the bullet screen content and is included in the content annotation, whether there is preset label information corresponding to the at least one keyword segment. It can be understood that, the application server may search for label information according to one or more keyword segments in the at least one keyword segment. The label information may be a brief description associated with the bullet screen content. The label information corresponding to the content annotation is preset before the search process. When obtaining at least one keyword segment corresponding to the bullet screen content, the application server may find the label information according to the at least one keyword segment.

When detecting that there is no preset label information corresponding to the at least one keyword segment, the application server may send a label information searching request including the at least one keyword segment to a searching device. It should be noted that, the searching device may be a search engine in the application server, or may be a search server independent of the application server. The searching device may obtain the at least one keyword segment, and output a search result corresponding to the at least one keyword segment. The search result may be a detailed description associated with the bullet screen content. The searching device may send the search result to the application server.

In some examples, when detecting that there is preset label information corresponding to the at least one keyword segment, the application server may obtain the label information without further requesting for a label information search. In some examples, the application server obtains the search result corresponding to the at least one keyword segment sent by the searching device, and extracts label information corresponding to the at least one keyword segment from the search result. According to the foregoing example, by searching for "AA", the related search result obtained may be: "AA, with the courtesy name of MM and literary name of NN, is a general of state C in the era of BB, achieving the military exploits as follows", and so on. By means of extraction from the search result, corresponding label information such as "AA is a general of state C in the era of BB" is obtained.

S403: Receive the bullet screen data stream that is sent by the application server in association with the multimedia data, the bullet screen data stream including the bullet screen content and the label information.

Specifically, the application server may generate a result link corresponding to the search result, and generate response information corresponding to the bullet screen content according to the result link and the label information. The application server adds the bullet screen content and the response information to the bullet screen data stream that is output in association with the multimedia data. According to the foregoing example, a result link corresponding to the search result "AA, with the courtesy name of MM and literary name of NN, is a general of state C in the era of BB, achieving the military exploits as follows" may be generated, for example, a link "click to see more". The result link is combined with the label information "AA is a general of state C in the time of BB", to generate response information "AA is a general of state C in the time of BB. Click to see more." The response information is added to the bullet screen data stream that is output in association with the multimedia data.

As shown in FIG. 4, the user terminal may display the bullet screen content and the response information in the playing interface 90, where "◀ — — —" is used for representing a movement direction of the bullet screen content and the response information in the playing interface 90. Also, the bullet screen content is "who is AA", and the response information may include label information 30 "AA is a general of state C in the era of BB" and a result link 40 "click to see more". In addition, the response information may further include a playing application identifier XX used for indicating that the current response information is automatic response information of a system.

In some examples, the application server may add only the bullet screen content to the bullet screen data stream that is output in association with the multimedia data, and send the response information to the user terminal corresponding to the application identifier for displaying. It can be understood that, data in the bullet screen data stream is obtained and displayed by all user terminals currently playing the multimedia data, while data sent according to the application identifier may only be obtained and displayed by the user terminal corresponding to the application identifier. Alternatively, when obtaining the bullet screen content sent by the user terminal, the application server may first add the bullet screen content to the bullet screen data stream to output the bullet screen content, and output the response information after the response information is generated.

The user terminal may receive the bullet screen data stream that is sent by the application server and that includes the bullet screen content and the label information. The user terminal according to the received bullet screen data stream displays the bullet screen content and the label information in an image of the currently played multimedia data.

S404: Send a request for displaying the search result to the application server when a triggering operation for the result link is received.

Specifically, when the user terminal detects a triggering operation for the result link, for example, when the user terminal detects a click operation for the result link, the user terminal may send, on the basis of the application identifier, a request for displaying the search result to the application server. The application server may obtain the request sent by the user terminal for displaying the search result. In some examples, the application server may encapsulate the search result by using a preset display format, and send an encapsulated search result to the user terminal corresponding to the application identifier.

S405: Receive an encapsulated search result sent by the application server, and display the encapsulated search result.

Specifically, the user terminal receives an encapsulated search result sent by the application server, and displays the encapsulated search result. It should be noted that, in some examples, the preset display format is a display format with a hovering, semitransparent attribute.

As shown in FIG. 5, the user terminal may display the encapsulated search result "AA, with the courtesy name of MM and literary name of NN, is a general of state C in the era of BB, achieving the military exploits as follows". A dashed block 50 in FIG. 5 is used for representing a display region of the encapsulated search result. After a user finishes browsing the encapsulated search result, the user closes the display region represented by dashed block 50 by clicking a close button 60 on the display region.

In this embodiment of this application, bullet screen content in association with currently played multimedia data is obtained, the bullet screen content is parsed to obtain a corresponding content annotation, label information corresponding to the content annotation is searched for, and the bullet screen content and the label information are output in a bullet screen manner. By parsing the bullet screen content and searching for and outputting the associated label information, a search for data content is completed without interrupting the currently played multimedia data, ensuring playing efficiency of the multimedia data and improving a user experience of playing the multimedia data. In addition, an automatic response to the bullet screen content is implemented, enriching presentation content of the multimedia data. By means of word segmentation processing and semantic recognition, the bullet screen content is parsed to further implement an automatic response to the bullet screen content. A display format with a hovering, semitransparent attribute allows a user to enjoy the multimedia data while browsing the search result, further improves the user experience of playing the multimedia data.

An application server provided in the embodiments of this application will be described in detail below with reference to FIG. 8 to FIG. 11. It should be noted that an exemplary application server as shown in any one or a combination of FIG. 8 to FIG. 11 is configured to execute the method in the embodiments shown in FIG. 1 and FIG. 2 of this application. For ease of description, only parts related to the embodiments of this application are shown. The description regarding technical details of the application server that are the same or similar to those described with reference to the embodiments shown in FIG. 1 and FIG. 2 of this application may be simplified or omitted.

Figure 8:
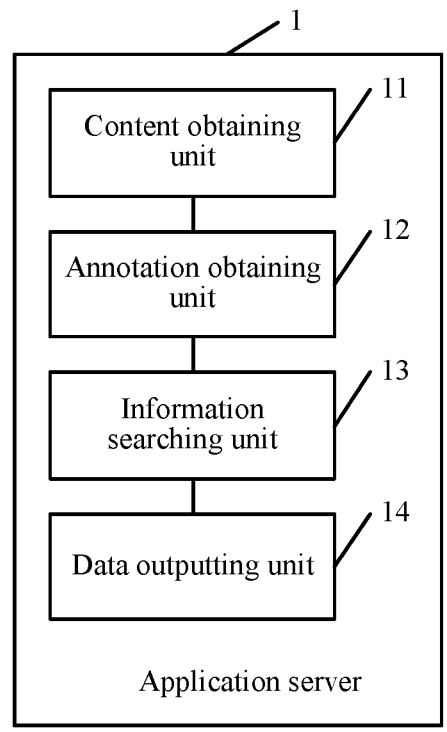
FIG. 8 is a block diagram of an application server according to an embodiment of this application.

Referring to FIG. 8, which is a block diagram of an application server according to an embodiment of this application. As shown in FIG. 8, the application server 1 according to this embodiment of this application may include: a content obtaining unit 11, an annotation obtaining unit 12, an information searching unit 13, and a data outputting unit 14.

The content obtaining unit 11 is configured to obtain bullet screen content that is sent by a user terminal in association with currently played multimedia data.

In one specific implementation, the content obtaining unit 11 may obtain bullet screen content that is sent by a user terminal and that is input by a user in association with currently played multimedia data. It can be understood that, when the user terminal plays the multimedia data, a user may input, in a bullet screen content input box provided by a user interface of the user terminal, bullet screen content to be used in a bullet screen service. The user terminal may send the bullet screen content to the application server 1, so as to request the application server 1 to add the bullet screen content to a bullet screen data stream that is in association with the currently played multimedia data. The content obtaining unit 11 may obtain the request of the user terminal for displaying the bullet screen content, and obtain the bullet screen content included in the display request.

As shown in FIG. 3, when a display screen 70 of the user terminal plays a video of multimedia data XX, a bullet screen button 80 may be displayed at a preset position of a playing interface 90, such as at a right edge of the playing interface 90 shown in FIG. 3. A user may move a cursor or use a finger, a stylus, or the like to click the bullet screen button 80 in order to activate a bullet screen service. In this case, the user terminal may display a bullet screen content input box, so that the user may input bullet screen content to be used in the bullet screen service.

It should be noted that, the user may register an application identifier, such as an application account, of a corresponding multimedia data playing application with the application server in advance, and may use the application identifier to log into the multimedia data playing application in the user terminal. After logging in successfully, the user may request to-be-played multimedia data from the application server.

The annotation obtaining unit 12 is configured to parse the bullet screen content, and obtain a content annotation corresponding to the bullet screen content according to the parsing.

In one specific implementation, the annotation obtaining unit 12 may parse the bullet screen content. The parsing may include word segmentation processing and semantic recognition processing on the bullet screen content. The annotation obtaining unit 12 obtains content annotation corresponding to the bullet screen content according to a result of the parsing. The content annotation may include at least one keyword segment corresponding to the bullet screen content. In some examples, the annotation obtaining unit 12 may perform word segmentation processing on the bullet screen content, obtain at least one character combination of the bullet screen content according to a result of the word segmentation processing, perform semantic recognition processing on the at least one character combination, and determine at least one keyword segment corresponding to the bullet screen content according to a result of the semantic recognition processing.

Figure 9:
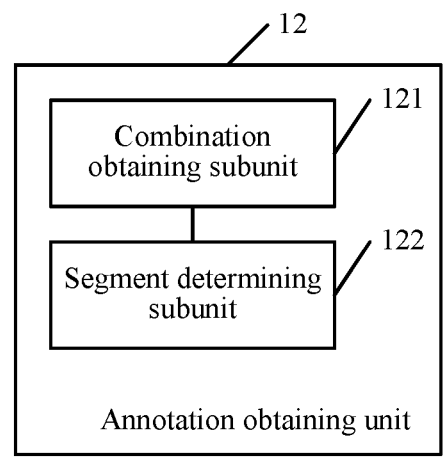
FIG. 9 is a block diagram of an annotation obtaining unit according to an embodiment of this application.

Specifically, referring to FIG. 9, which is a block diagram of an annotation obtaining unit according to an embodiment of this application. As shown in FIG. 9, the annotation obtaining unit 12 may include a combination obtaining subunit 121 and a segment determining subunit 122.

The combination obtaining subunit 121 is configured to perform word segmentation processing on the bullet screen content by using a preset lexicon, and obtain at least one character combination of the bullet screen content according to the word segmentation processing.

In some examples, the combination obtaining subunit 121 may perform word segmentation processing on the bullet screen content. A corresponding lexicon may be preset in the application server 1. The combination obtaining subunit 121 may perform word segmentation processing on the bullet screen content by using the preset lexicon, and obtain at least one character combination of the bullet screen content according to the word segmentation processing. For example, the bullet screen content is "who is AA", and characters of "A", "AA", "is AA", "is A", "who is" and so on are obtained according to a result of performing the word segmentation processing. The combination obtaining subunit 121 may screen out at least one character combination of the bullet screen content by using the preset lexicon. For example, it is obtained through matching in the preset lexicon that "A", "AA", and "who is" are complete terms, and at least one character combination of "A", "AA", and "who is" is obtained.

The segment determining subunit 122 is configured to determine at least one keyword segment corresponding to the bullet screen content from the at least one character combination on the basis of a preset term attribute and a segment context.

In one specific implementation, the segment determining subunit 122 may determine at least one keyword segment corresponding to the bullet screen content from the at least one character combination on the basis of a preset term attribute and a segment context. For example, the at least one character combination corresponding to the bullet screen content "who is AA" includes "A", "AA", and "who is". It is obtained that the preset term attributes of "A" and "AA" are common character terms, and the preset term attribute of "who is" is a term expressing a query. The presence of the character term "AA" after "who is" represents the meaning of a query about the character term "AA". Therefore, it is determined that the at least one keyword segment is "AA" and "who is".

The information searching unit 13 is configured to search for label information corresponding to the content annotation.

In one specific implementation, the information searching unit 13 may search for label information corresponding to the content annotation. The label information may be a brief description associated with the bullet screen content. The label information corresponding to the content annotation is preset before the search process. When the annotation obtaining unit 12 obtains the content annotation corresponding to the bullet screen content, the information searching unit 13 may find the label information according to the content annotation.

In some examples, the information searching unit 13 may search, according to at least one keyword segment that corresponds to the bullet screen content and is included in the content annotation, label information corresponding to the at least one keyword segment. Further, the information searching unit 13 detects, according to at least one keyword segment that corresponds to the bullet screen content and is included in the content annotation, whether there is preset label information corresponding to the at least one keyword segment. When detecting that there is preset label information corresponding to the at least one keyword segment, the information searching unit 13 may obtain the preset label information without further requesting for a label information search. When detecting that there is no preset label information corresponding to the at least one keyword segment, the information searching unit 13 may send a label information searching request including the keyword segment to a searching device. It should be noted that, the searching device may be a search engine in the application server 1, or may be a search server independent of the application server 1. The searching device may obtain the at least one keyword segment, and output a search result corresponding to the at least one keyword segment. The search result may be a detailed description associated with the bullet screen content. The searching device may send the search result to the application server 1. The information searching unit 13 obtains the search result corresponding to the at least one keyword segment sent by the searching device, and extracts label information corresponding to the at least one keyword segment from the search result.

Figure 10:
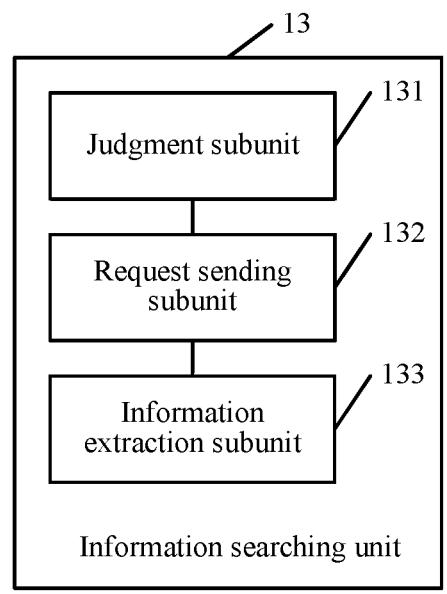
FIG. 10 is a block diagram of an information searching unit according to an embodiment of this application.

Specifically, referring to FIG. 10, which is a block diagram of an information searching unit according to an embodiment of this application. As shown in FIG. 10, the information searching unit 13 may include a judgment subunit 131, request sending subunit 132, and an information extraction subunit 133.

The judgment subunit 131 is configured to detect, according to at least one keyword segment that corresponds to the bullet screen content and is included in the content annotation, whether there is preset label information corresponding to the at least one keyword segment.

In one specific implementation, the judgment subunit 131 may detect, according to at least one keyword segment that corresponds to the bullet screen content and is included in the content annotation, whether there is preset label information corresponding to the at least one keyword segment. It can be understood that, the judgment subunit 131 may search for label information according to one or more keyword segments in the at least one keyword segment. The label information may be a brief description associated with the bullet screen content.

The request sending subunit 132 is configured to send a label information searching request including the at least one keyword segment to a searching device when there is no preset label information corresponding to the at least one keyword segment, so that the searching device output a search result corresponding to the at least one keyword segment.

In one specific implementation, when the judgment subunit 131 detects that there is no preset label information corresponding to the at least one keyword segment, the request sending subunit 132 may send a label information searching request including the keyword segment to a searching device. It should be noted that, the searching device may be a search engine in the application server 1, or may be a search server independent of the application server 1. The searching device may obtain the at least one keyword segment, and output a search result corresponding to the at least one keyword segment. The search result may be a detailed description associated with the bullet screen content. The searching device may send the search result to the application server 1.

In some examples, when the judgment subunit 131 detects that there is preset label information corresponding to the at least one keyword segment, the information searching unit 13 may obtain the preset label information without further requesting for a label information search.

The information extraction subunit 133 is configured to obtain the search result corresponding to the at least one keyword segment sent by the searching device, and extracts label information corresponding to the at least one keyword segment from the search result.

In some examples, the information extraction subunit 133 obtains the search result corresponding to the at least one keyword segment sent by the searching device, and extracts label information corresponding to the at least one keyword segment from the search result. According to the foregoing example, by searching for "AA", the related search result obtained may be: "AA, with the courtesy name of MM and literary name of NN, is a general of state C in the era of BB, achieving the military exploits as follows", and so on. By means of extraction from the search result, corresponding label information such as "AA is a general of state C in the era of BB" is obtained.

The data outputting unit 14 is configured to add the bullet screen content and the label information to a bullet screen data stream that is to be output in association with the multimedia data.

In some examples, the data outputting unit 14 may add the bullet screen content and the label information to a bullet screen data stream that is to be output in association with the multimedia data. Further, the data outputting unit 14 may generate a result link corresponding to the search result, and generate response information corresponding to the bullet screen content according to the result link and the label information. The data outputting unit 14 adds the bullet screen content and the response information to the bullet screen data stream that is to be output in association with the multimedia data. In some examples, the data outputting unit 14 outputs the bullet screen data stream that includes the bullet screen content and the response information.

Figure 11:
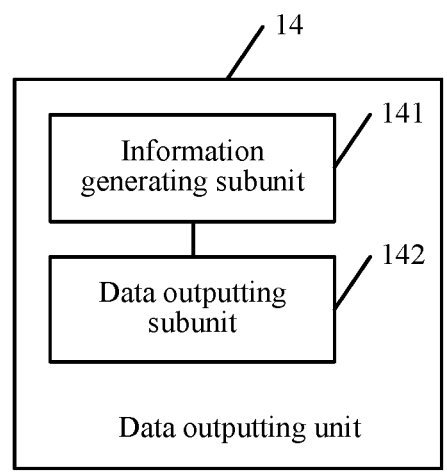
FIG. 11 is a block diagram of a data outputting unit according to an embodiment of this application.

Specifically, referring to FIG. 11, which is a block diagram of a data outputting unit according to an embodiment of this application. As shown in FIG. 11, the data outputting unit 14 may include an information generating subunit 141 and a data outputting subunit 142.

The information generating subunit 141 is configured to generate a result link corresponding to the search result, and generate response information corresponding to the bullet screen content according to the result link and the label information.

The data outputting subunit 142 is configured to add the bullet screen content and the response information to the bullet screen data stream that is to be output in association with the multimedia data. In some examples, the data outputting unit 14 outputs the bullet screen data stream that includes the bullet screen content and the response information.

In some examples, the information generating subunit 141 may generate a result link corresponding to the search result, and generate response information corresponding to the bullet screen content according to the result link and the label information. The data outputting subunit 142 adds the bullet screen content and the response information to the bullet screen data stream that is to be output in association with the multimedia data. According to the foregoing example, a result link corresponding to the search result "AA, with the courtesy name of MM and literary name of NN, is a general of state C in the era of BB, achieving the military exploits as follows" may be generated, for example, a link "click to see more". The result link is combined with the label information "AA is a general of state C in the era of BB", to generate response information "AA is a general of state C in the era of BB. Click to see more." The response information is added to the bullet screen data stream that is to be output in association with the multimedia data, so as to be output.

As shown in FIG. 4, the user terminal may display the bullet screen content and the response information in the playing interface 90, where "◄ — — —" is used for representing a movement direction of the bullet screen content and the response information in the playing interface 90. Also, the bullet screen content is "who is AA", and the response information may include label information 30 "AA is a general of state C in the era of BB" and a result link 40 "click to see more". In addition, the response information may further include a playing application identifier XX used for indicating that the current response information is automatic response information of a system.

In some examples, the data outputting subunit 142 may add only the bullet screen content to the bullet screen data stream that is output in association with the multimedia data, and send the response information to the user terminal corresponding to the application identifier for displaying. It can be understood that, data in the bullet screen data stream is obtained and displayed by all user terminals currently playing the multimedia data, while data sent according to the application identifier may only be obtained and displayed by the user terminal corresponding to the application identifier. Alternatively, when obtaining the bullet screen content sent by the user terminal, the data outputting subunit 142 may first add the bullet screen content to the bullet screen data stream to output the bullet screen content, and output the response information after the response information is generated.

The content obtaining unit 11 is further configured to obtain a request sent by the user terminal for displaying the search result, when a triggering operation for the result link is detected.

The data outputting unit 14 is further configured to encapsulate the search result by using a preset display format, and send an encapsulated search result to the user terminal.

In some examples, when the user terminal detects a triggering operation for the result link, for example, when the user terminal detects a click operation for the result link, the user terminal may send, on the basis of the application identifier, a request for displaying the search result to the application server 1. The content obtaining unit 11 may obtain the request sent by the user terminal for displaying the search result. In some examples, the content obtaining unit 11 may encapsulate the search result by using a preset display format, and send an encapsulated search result to the user terminal corresponding to the application identifier. The user terminal displays the encapsulated search result. It should be noted that, in some examples, the preset display format is a display format with a hovering, semitransparent attribute.

As shown in FIG. 5, the user terminal may display the encapsulated search result "AA, with the courtesy name of MM and literary name of NN, is a general of state C in the era of BB, achieving the military exploits as follows". A dashed block 50 in FIG. 5 is used for representing a display region of the encapsulated search result. After a user finishes browsing the encapsulated search result, the user may close the display region represented by dashed block 50 by clicking a close button 60 on the display region.

According to an embodiment of this application, the bullet screen content processing method shown in FIG. 1 to FIG. 2 may be performed by the units in the application server shown in FIG. 8 to FIG. 11. For example, steps S101, S102, S103 and S104 shown in FIG. 1 may be respectively performed by the content obtaining unit 11, the annotation obtaining unit 12, the information searching unit 13 and the data outputting unit 14 shown in FIG. 8. Step S201 to step S210 shown in FIG. 2 may be respectively performed by the content obtaining unit 11, the combination obtaining subunit 121, the segment determining subunit 122, the judgment subunit 131, the request sending subunit 132, the information extraction subunit 133, the information generating subunit 141, the data outputting subunit 142, the content obtaining unit 11 and the data outputting unit 14 shown in FIG. 8 to FIG. 11.

According to another embodiment of this application, the units in the application server shown in FIG. 8 to FIG. 11 may be separately or all combined into one or several other units, or a unit or some units therein may further be divided into multiple smaller units in terms of functions. This may implement the same operation without affecting the implementation of the technical effect of this embodiment of this application. The units above are logically divided. In actual application, the function of one unit may also be implemented by multiple units, or functions of multiple units may be implemented by one unit. In other embodiments of this application, the application server may further include other modules. However, in actual application, these functions may also be implemented with the assistance of other units, and may be implemented by multiple units in coordination.

According to another embodiment of this application, a computer program (including program code) corresponding to implementing the bullet screen content processing method shown in FIG. 1 to FIG. 2 may be executed by a general-purpose computing device, such as a computer, including processing elements such as a central processing unit (CPU), a random access memory (RAM), and a read-only memory (ROM) and storage elements, to construct the application server shown in FIG. 8 to FIG. 11, and implement the bullet screen content processing method according to the embodiments of this application. The computer program may be recorded on a non-transitory computer-readable recording medium for example, and may be loaded and run in the computer device by means of the computer readable recording medium.

In this embodiment of this application, bullet screen content in association with currently played multimedia data is obtained, the bullet screen content is parsed to obtain a corresponding content annotation, label information corresponding to the content annotation is searched for, and the bullet screen content and the label information are output in a bullet screen manner. By parsing the bullet screen content and searching for and outputting the associated label information, a search for data content is completed without interrupting the currently played multimedia data, ensuring playing efficiency of the multimedia data and improving a user experience of playing the multimedia data. In addition, an automatic response to the bullet screen content is implemented, enriching presentation content of the multimedia data. By means of word segmentation processing and semantic recognition, the bullet screen content is parsed to further implement an automatic response to the bullet screen content. A display format with a hovering, semitransparent attribute allows a user to enjoy the multimedia data while browsing the search result, further improves the playing effect of the multimedia data.

Figure 12:
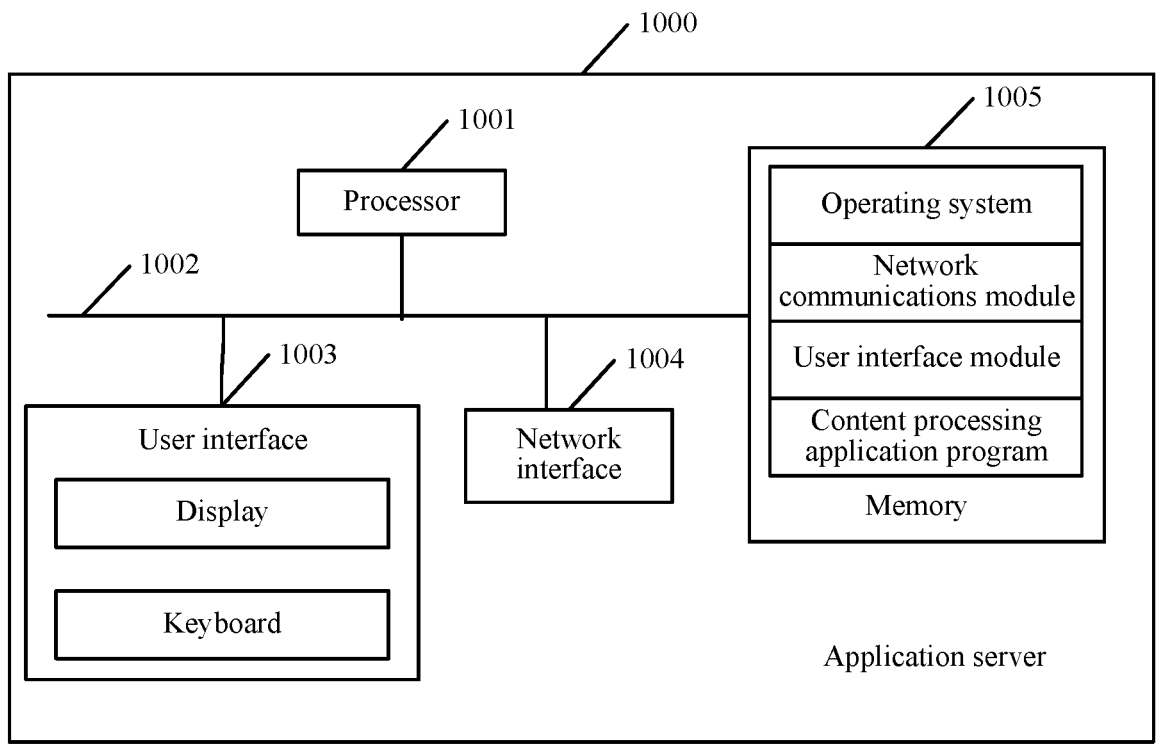
FIG. 12 is a block diagram of another application server according to an embodiment of this application.

Referring to FIG. 12, which is a block diagram of another application server according to an embodiment of this application. As shown in FIG. 12, the application server 1000 may include: at least one processor 1001, such as a CPU, at least one network interface 1004, a user interface 1003, a memory 1005, and at least one communications bus 1002. The communications bus 1002 is configured to implement communication connection between these components. The user interface 1003 may include a display and a keyboard. Optionally, the user interface 1003 may further include a wired interface and/or a wireless interface. The network interface 1004 may include a wired interface and/or a wireless interface (such as a Wi-Fi interface). The memory 1005 may be a high-speed RAM, or a non-volatile memory, such as at least one magnetic disk memory. In some examples, the memory 1005 may further be a storage apparatus away from the processor 1001. As shown in FIG. 12, as a computer storage medium, the memory 1005 may include an operating system, a network communications module, a user interface module, and a content processing application program.

In the application server 1000 shown in FIG. 12, the user interface 1003 is mainly configured to provide an input interface for a user, and obtain data input by the user. The network interface 1004 is configured to receive data sent by a user terminal. The processor 1001 may be configured to execute the content processing application program stored in the memory 1005, and perform the following operations:

obtaining bullet screen content that is sent by a user terminal in association with currently played multimedia data;

obtaining a content annotation corresponding to the bullet screen content by parsing the bullet screen content, wherein the content annotation includes at least one keyword segment corresponding to the bullet screen content;

searching for label information corresponding to the content annotation; and adding the bullet screen content and the label information to a bullet screen data stream that is output in association with the multimedia data.

In an embodiment, the processor 1001 performs the following operations:

performing word segmentation processing on the bullet screen content;

obtaining at least one character combination of the bullet screen content according to the word segmentation processing;

performing semantic recognition processing on the at least one character combination; and determining the at least one keyword segment corresponding to the bullet screen content according to the semantic recognition processing.

In an embodiment, when performing word segmentation processing on the bullet screen content, obtaining at least one character combination of the bullet screen content after the word segmentation processing, performing semantic recognition processing on the at least one character combination, and determining at least one keyword segment corresponding to the bullet screen content after the semantic recognition processing, the processor 1001 performs the word segmentation processing by using a preset lexicon. In an embodiment, the determining the at least one keyword segment corresponding to the bullet screen content is performed based on a preset term attribute and a segment context.

In an embodiment, when searching for label information corresponding to the content annotation, the processor 1001 performs at least searching, according to the at least one keyword segment that corresponds to the bullet screen content and is included in the content annotation, for the label information corresponding to the at least one keyword segment.

In an embodiment, when searching, according to at least one keyword segment that corresponds to the bullet screen content and is included in the content annotation, for label information corresponding to the at least one keyword segment, the processor 1001 performs the following operations:

detecting, according to the at least one keyword segment that corresponds to the bullet screen content and is included in the content annotation, whether there is preset label information corresponding to the at least one keyword segment;

sending a label information searching request including the at least one keyword segment to a searching device when there is no preset label information corresponding to the at least one keyword segment, so that the searching device looks for a search result corresponding to the at least one keyword segment; and obtaining the search result corresponding to the at least one keyword segment sent by the searching device, and extracting the label information corresponding to the at least one keyword segment from the search result.

In an embodiment, when adding the bullet screen content and the label information to the bullet screen data stream that is output in association with the multimedia data, the processor 1001 performs the following operations:

generating a result link corresponding to the search result, and generating response information corresponding to the bullet screen content according to the result link and the label information; and adding the bullet screen content and the response information to the bullet screen data stream that is output in association with the multimedia data.

In an embodiment, the processor 1001 performs the following operations:

obtaining a request sent by the user terminal for displaying the search result, when a triggering operation for the result link is detected; and encapsulating the search result by using a preset display format, and sending an encapsulated search result to the user terminal, so that the user terminal displays the encapsulated search result.

In an embodiment, the preset display format is a display format with a hovering, semitransparent attribute.

In this embodiment of this application, bullet screen content in association with currently played multimedia data is obtained, the bullet screen content is parsed to obtain a corresponding content annotation, label information corresponding to the content annotation is searched for, and the bullet screen content and the label information are output in a bullet screen manner. By parsing the bullet screen content and searching for and outputting the associated label information, a search for data content is completed without interrupting the currently played multimedia data, ensuring playing efficiency of the multimedia data and improving a user experience of playing the multimedia data. In addition, an automatic response to the bullet screen content is implemented, enriching presentation content of the multimedia data. By means of word segmentation processing and semantic recognition, the bullet screen content is parsed to further implement an automatic response to the bullet screen content. A display format with a hovering, semitransparent attribute allows a user to enjoy the multimedia data while browsing the search result, further improves the playing effect of the multimedia data.

Figure 13:
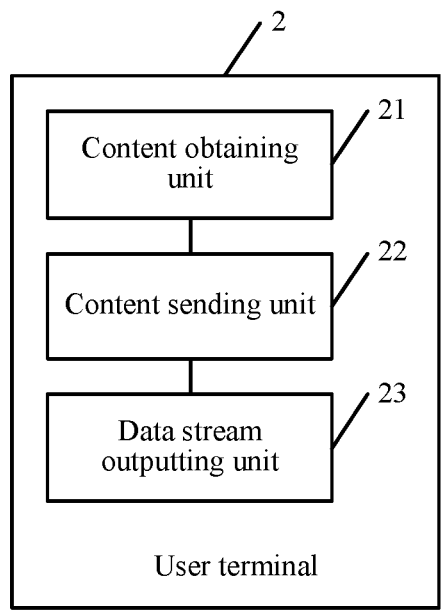
FIG. 13 is a block diagram of a user terminal according to an embodiment of this application.
Figure 14:
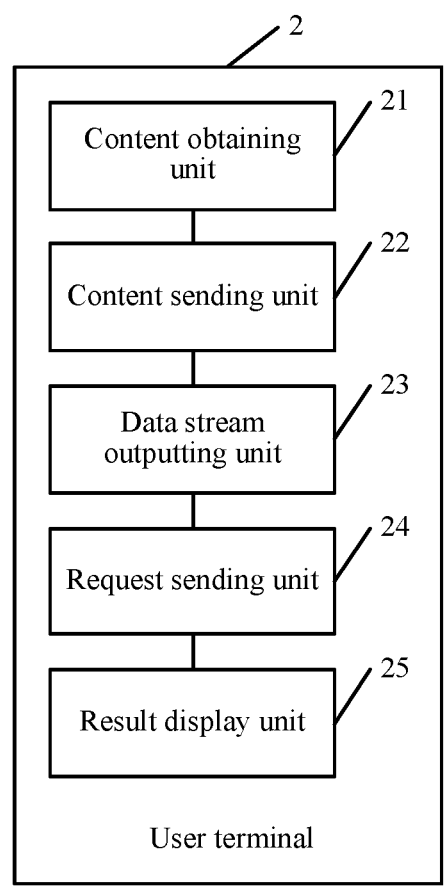
FIG. 14 is a block diagram of another user terminal according to an embodiment of this application.

A user terminal provided in the embodiments of this application will be described in detail below with reference to FIG. 13 and FIG. 14. It should be noted that, an exemplary user terminal as shown in any one or a combination of FIG. 13 and FIG. 14 is configured to execute the method in the embodiments shown in FIG. 6 and FIG. 7 of this application. For ease of description, only parts related to the embodiments of this application are shown. The description regarding technical details of the application server that are the same or similar to those described with reference to the embodiments shown in FIG. 6 and FIG. 7 of this application may be simplified or omitted.

Referring to FIG. 13, which is a block diagram of a user terminal according to an embodiment of this application. As shown in FIG. 13, the user terminal 2 according to this embodiment of this application may include a content obtaining unit 21, a content sending unit 22, and a data stream outputting unit 23.

The content obtaining unit 21 is configured to obtain bullet screen content that is input in association with currently played multimedia data.

In one specific implementation, when the user terminal 2 plays the multimedia data, a user may input, in a bullet screen content input box provided by a user interface of the user terminal 2, bullet screen content to be used in a bullet screen service. The content obtaining unit 21 may obtain the bullet screen content.

The content sending unit 22 is configured to send the bullet screen content to an application server.

In one specific implementation, the content sending unit 22 may send the bullet screen content to the application server, so as to request the application server to add the bullet screen content to a bullet screen data stream that is output by the application server in association with the multimedia data. The application server may obtain the request of the user terminal 2 for displaying the bullet screen content, and obtain the bullet screen content included in the display request.

The application server may parse the bullet screen content. The parsing may include word segmentation processing and semantic recognition processing on the bullet screen content. The application server obtains content annotation corresponding to the bullet screen content according to the parsing. The content annotation may include at least one keyword segment corresponding to the bullet screen content. In some examples, the application server may perform word segmentation processing on the bullet screen content, obtain at least one character combination of the bullet screen content according to the word segmentation processing, perform semantic recognition processing on the at least one character combination, and determine at least one keyword segment corresponding to the bullet screen content according to the semantic recognition processing.

The application server may search for label information corresponding to the content annotation. The label information may be a brief description associated with the bullet screen content. The label information corresponding to the content annotation is preset before the search process. When obtaining the content annotation corresponding to the bullet screen content, the application server may find the label information according to the content annotation.

The application server may add the bullet screen content and the label information to a bullet screen data stream that is output by the application server in association with the multimedia data, to output the bullet screen content and the label information.

The data stream outputting unit 23 is configured to receive the bullet screen data stream that is sent by the application server in association with the multimedia data, the bullet screen data stream including the bullet screen content and the label information. The data stream outputting unit 23 may output content of the bullet screen data stream along with the currently played multimedia data.

In one specific implementation, the data stream outputting unit 23 may receive the bullet screen data stream that is sent by the application server and that includes the bullet screen content and the label information, and output content of the bullet screen data stream along with the currently played multimedia data. For example, the data stream outputting unit 23 displays the bullet screen content and the label information in an image of the currently played multimedia data.

In this embodiment of this application, bullet screen content in association with currently played multimedia data is obtained, the bullet screen content is parsed to obtain a corresponding content annotation, label information corresponding to the content annotation is searched for, and the bullet screen content and the label information are finally output in a bullet screen manner. By parsing the bullet screen content and searching for and outputting the associated label information, a search for data content may be completed without interrupting the currently played multimedia data, ensuring playing efficiency of the multimedia data and improving a user experience of playing the multimedia data. In addition, an automatic response to the bullet screen content is implemented, enriching presentation content of the multimedia data.

Referring to FIG. 14, which is a block diagram of another user terminal according to an embodiment of this application. As shown in FIG. 14, the user terminal 2 in this embodiment of this application may include: a content obtaining unit 21, a content sending unit 22, a data stream outputting unit 23, a request sending unit 24, and a result display unit 25.

The content obtaining unit 21 is configured to obtain bullet screen content that is input in association with currently played multimedia data.

In one specific implementation, when the user terminal 2 plays the multimedia data, a user may input, in a bullet screen content input box provided by a user interface of the user terminal 2, bullet screen content to be used in a bullet screen service. The content obtaining unit 21 may obtain the bullet screen content.

It should be noted that, the user may register an application identifier, such as an application account, of a corresponding multimedia data playing application with the application server in advance, and may use the application identifier to log into the multimedia data playing application in the user terminal 2. After logging in successfully, the user may request to-be-played multimedia data from the application server.

The content sending unit 22 is configured to send the bullet screen content to an application server.

In one specific implementation, the content sending unit 22 may send the bullet screen content to the application server, so as to request the application server to add the bullet screen content to a bullet screen data stream that is output by the application server in association with the multimedia data. The application server may obtain the request of the user terminal 2 for displaying the bullet screen content, and obtain the bullet screen content included in the display request.

The application server may perform word segmentation processing on the bullet screen content. A corresponding lexicon may be preset in the application server. The application server may perform word segmentation processing on the bullet screen content by using the preset lexicon, and obtain at least one character combination of the bullet screen content according to the word segmentation processing. For example, the bullet screen content is "who is AA", and the key segments of "A", "AA", "is AA", "is A", "who is" and so on are obtained according to a result of performing word segmentation processing. The application server may screen out at least one character combination of the bullet screen content by using the preset lexicon. For example, it is obtained through matching in the preset lexicon that "A", "AA", and "who is" are complete terms, and at least one character combination of "A", "AA", and "who is" is obtained. The application server may determine at least one keyword segment corresponding to the bullet screen content from the at least one character combination on the basis of a preset term attribute and a field context. For example, the at least one character combination corresponding to the bullet screen content "who is AA" includes "A", "AA", and "who is". It is obtained that the preset term attributes of "A" and "AA" are common character terms, and the preset term attribute of "who is" is a term expressing a query. The presence of the character term "AA" after "who is" represents the meaning of a query about the character term "AA". Therefore, it is determined that the at least one keyword segment is "AA" and "who is".

The application server may detect, according to at least one keyword segment that corresponds to the bullet screen content and is included in the content annotation, whether there is preset label information corresponding to the at least one keyword segment. It can be understood that, the application server may search for label information according to one or more keyword segments in the at least one keyword segment. The label information may be a brief description associated with the bullet screen content. The label information corresponding to the content annotation is preset before the search process. When obtaining at least one keyword segment corresponding to the bullet screen content, the application server may find the label information according to the at least one keyword segment.

When detecting that there is no preset label information corresponding to the at least one keyword segment, the application server may send a label information searching request including the at least one keyword segment to a searching device. It should be noted that, the searching device may be a search engine in the application server, or may be a search server independent of the application server. The searching device may obtain the at least one keyword segment, and output a search result corresponding to the at least one keyword segment. The search result may be a detailed description associated with the bullet screen content. The searching device may send the search result to the application server.

In some examples, when detecting that there is preset label information corresponding to the at least one keyword segment, the application server may obtain the label information without further requesting for a label information search. In some examples, the application server obtains the search result corresponding to the at least one keyword segment sent by the searching device, and extracts label information corresponding to the at least one keyword segment from the search result. According to the foregoing example, by searching for "AA", the related search result obtained may be: "AA, with the courtesy name of MM and literary name of NN, is a general of state C in the era of BB, achieving the military exploits as follows", and so on. By means of extraction from the search result, corresponding label information such as "AA is a general of state C in the era of BB" may be obtained.

The data stream outputting unit 23 is configured to receive the bullet screen data stream that is sent by the application server in association with the multimedia data, the bullet screen data stream including the bullet screen content and the label information. The data stream outputting unit 23 outputs content of the bullet screen data stream along with the currently played multimedia data.

In one specific implementation, the application server may generate a result link corresponding to the search result, and generate response information corresponding to the bullet screen content according to the result link and the label information. The application server adds the bullet screen content and the response information to the bullet screen data stream in association with the multimedia data. According to the foregoing example, a result link corresponding to the search result "AA, with the courtesy name of MM and literary name of NN, is a general of state C in the era of BB, achieving the military exploits as follows" may be generated, for example, a link "click to see more". The result link is combined with the label information "AA is a general of state C in the era of BB", to generate response information "AA is a general of state C in the era of BB. Click to see more." The response information is added to the bullet screen data stream that is to be output in association with the multimedia data.

As shown in FIG. 4, the data stream outputting unit 23 may display the bullet screen content and the response information in the playing interface 90, where "◀ — — —" is used for representing a movement direction of the bullet screen content and the response information in the playing interface 90. Also, the bullet screen content is "who is AA", and the response information may include label information 30 "AA is a general of state C in the era of BB" and a result link 40 "click to see more". In addition, the response information may further include a playing application identifier XX used for indicating that the current response information is automatic response information of a system.

In some examples, the application server may add only the bullet screen content to the bullet screen data stream that is output in association with the multimedia data, and send the response information to the user terminal 2 corresponding to the application identifier for displaying. It can be understood that, data in the bullet screen data stream is obtained and displayed by all user terminals 2 currently playing the multimedia data, while data sent according to the application identifier may only be obtained and displayed by the user terminal 2 corresponding to the application identifier. Alternatively, when obtaining the bullet screen content sent by the user terminal, the application server may first add the bullet screen content to the bullet screen data stream to output the bullet screen content, and output the response information after the response information is generated.

The data stream outputting unit 23 may receive the bullet screen data stream that is sent by the application server and that includes the bullet screen content and the label information, and output the content of the bullet screen data stream. For example, the data stream outputting unit 23 displays the bullet screen content and the label information in an image of the currently played multimedia data.

The request sending unit 24 is configured to send a request for displaying the search result to the application server when a triggering operation for the result link is received.

In some examples, when the user terminal 2 detects a triggering operation for the result link, for example, when the user terminal 2 detects a click operation for the result link, the request sending unit 24 may send, on the basis of the application identifier, a request for displaying the search result to the application server. The application server may obtain the request sent by the user terminal 2 for displaying the search result. In some examples, the application server may encapsulate the search result by using a preset display format, and send an encapsulated search result to the user terminal 2 corresponding to the application identifier.

The result display unit 25 is configure to receive an encapsulated search result sent by the application server, and display the encapsulated search result.

In one specific implementation, the result display unit 25 receives an encapsulated search result sent by the application server, and displays the encapsulated search result. It should be noted that, in some examples, the preset display format is a display format with a hovering, semitransparent attribute.

As shown in FIG. 5, the result display unit 25 may display the encapsulated search result "AA, with the courtesy name of MM and literary name of NN, is a general of state C in the era of BB, achieving the military exploits as follows". A dashed block 50 in FIG. 5 is used for representing a display region of the encapsulated search result. After a user finishes browsing the encapsulated search result, the user may close the display region represented by dashed block 50 by clicking a close button 60 on the display region.

According to an embodiment of this application, the bullet screen content processing method shown in FIG. 6 to FIG. 7 may be performed by the units in the user terminal shown in FIG. 13 to FIG. 14. For example, steps S301, S302 and S303 shown in FIG. 6 may be respectively performed by the content obtaining unit 21, the content sending unit 22, and the data stream outputting unit 23 shown in FIG. 13. Step S401 to step S405 shown in FIG. 7 may be respectively performed by the content obtaining unit 21, the content sending unit 22, the data stream outputting unit 23, the request sending unit 24 and the result display unit 25 shown in FIG. 17.

According to another embodiment of this application, the units in the user terminal shown in FIG. 13 to FIG. 14 may be separately or all combined into one or several other units, or a unit or some units therein may further be divided into multiple smaller units in terms of functions. This may implement the same operation without affecting the implementation of the technical effect of this embodiment of this application. The units above are logically divided. In actual application, the function of one unit may also be implemented by multiple units, or functions of multiple units may be implemented by one unit. In other embodiments of this application, the user terminal may further include other modules. However, in actual application, these functions may also be implemented with the assistance of other units, and may be implemented by multiple units in coordination.

According to another embodiment of this application, a computer program (including program code) corresponding to implementing the bullet screen content processing method shown in FIG. 6 to FIG. 7 may be executed by a general-purpose computing device, such as a computer, including processing elements such as a CPU, a RAM, and a ROM and storage elements, to construct the user terminal shown in FIG. 13 to FIG. 14, and implement the bullet screen content processing method according to the embodiments of this application. The computer program may be recorded on a non-transitory computer-readable recording medium for example, and may be loaded and run in the computer device by means of the computer readable recording medium.

In this embodiment of this application, bullet screen content in association with currently played multimedia data is obtained, the bullet screen content is parsed to obtain a corresponding content annotation, label information corresponding to the content annotation is searched for, and the bullet screen content and the label information are finally output in a bullet screen manner. By parsing the bullet screen content and searching for and outputting the associated label information, a search for data content is completed without interrupting the currently played multimedia data, ensuring playing efficiency of the multimedia data and improving a user experience of playing the multimedia data. In addition, an automatic response to the bullet screen content is implemented, enriching presentation content of the multimedia data. By means of word segmentation processing and semantic recognition, the bullet screen content is parsed to further implement an automatic response to the bullet screen content. A display format with a hovering, semitransparent attribute allows a user to enjoy the multimedia data while browsing the search result, further improves the playing effect of the multimedia data.

Figure 15:
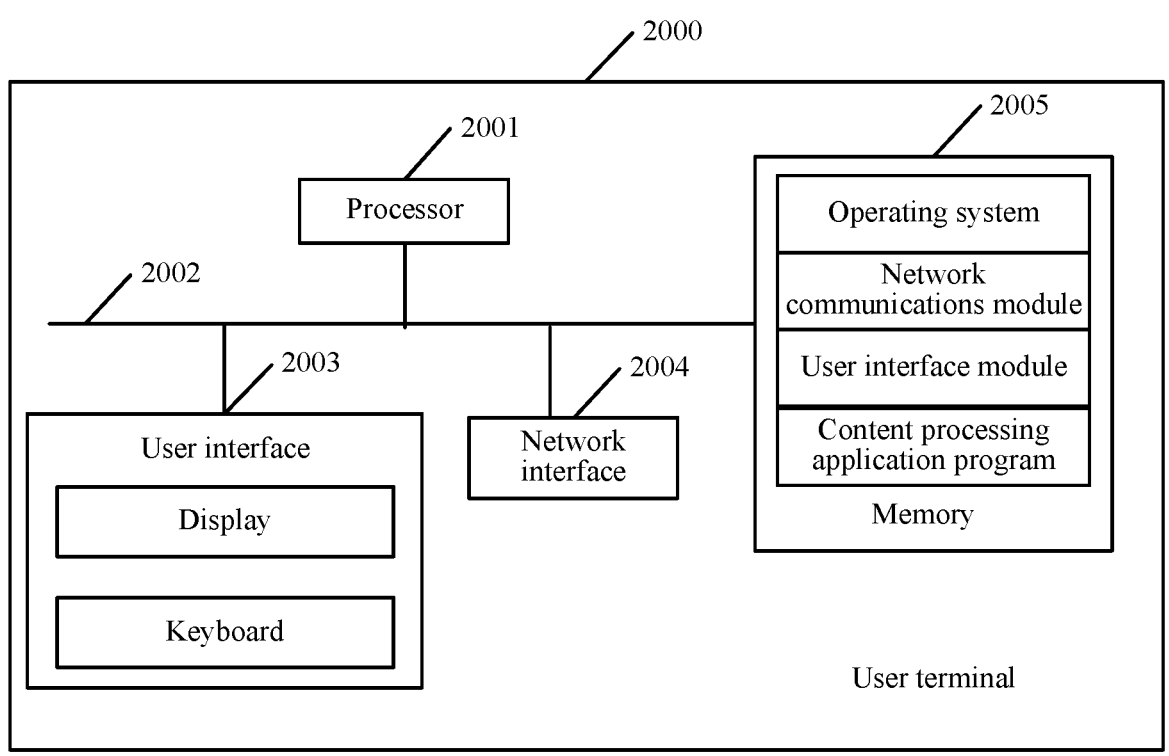
FIG. 15 is a block diagram of still another user terminal according to an embodiment of this application.

Referring to FIG. 15, which is a block diagram of another user terminal according to an embodiment of this application. As shown in FIG. 15, the user terminal 200 may include: at least one processor 2001, such as a CPU, at least one network interface 2004, a user interface 2003, a memory 2005, and at least one communications bus 2002. The communications bus 2002 is configured to implement communication connection between these components. The user interface 2003 may include a display and a keyboard. Optionally, the user interface 2003 may further include a wired interface and/or a wireless interface. The network interface 2004 may optionally include a wired interface and/or a wireless interface (such as a Wi-Fi interface). The memory 2005 may be a high-speed RAM, or a non-volatile memory, such as at least one magnetic disk memory. In some examples, the memory 2005 may further be a storage apparatus away from the processor 2001. As shown in FIG. 15, as a computer storage medium, the memory 2005 may include an operating system, a network communications module, a user interface module, and a content processing application program.

In the user terminal 2000 shown in FIG. 15, the user interface 2003 is mainly configured to provide an input interface for a user, and obtain data input by the user. The network interface 2004 is configured to receive data sent by a user terminal. The processor 2001 may be configured to execute the content processing application program stored in the memory 2005, and perform the following operations:

obtaining bullet screen content that is input in association with currently played multimedia data;

sending the bullet screen content to an application server, so that the application server obtains a content annotation corresponding to the bullet screen content by parsing the bullet screen content and searches for label information corresponding to the content annotation, wherein the content annotation includes at least one keyword segment corresponding to the bullet screen content; and receiving a bullet screen data stream that is sent by the application server in association with the multimedia data, the bullet screen data stream including the bullet screen content and the label information In an embodiment, the bullet screen data stream that is sent by the application server includes the bullet screen content and response information. In an embodiment, the response information includes the label information and a result link corresponding to a search result, the search result being a result obtained by the application server by searching for the at least one keyword segment included in the content annotation, and the search result including the label information.

In an embodiment, the processor 2001 further performs the following operations:

sending a request for displaying the search result to the application server when a triggering operation for the result link is received, so that the application server encapsulates the search result by using a preset display format; and receiving an encapsulated search result sent by the application server, and displaying the encapsulated search result, where the preset display format is a display format with a hovering, semitransparent attribute.

In this embodiment of this application, bullet screen content in association with currently played multimedia data is obtained, the bullet screen content is parsed to obtain a corresponding content annotation, label information corresponding to the content annotation is searched for, and the bullet screen content and the label information are output in a bullet screen manner. By parsing the bullet screen content and searching for and outputting the associated label information, a search for data content is completed without interrupting the currently played multimedia data, ensuring playing efficiency of the multimedia data and improving a user experience of playing the multimedia data. In addition, an automatic response to the bullet screen content is implemented, enriching presentation content of the multimedia data. By means of word segmentation processing and semantic recognition, the bullet screen content is parsed to further implement an automatic response to the bullet screen content. A display format with a hover semitransparent attribute allows a user to enjoy the multimedia data while browsing the search result, further improves the user experience of playing the multimedia data.

It should be understood that, the parts of this application is implemented by using hardware, software, firmware or a combination thereof. In the foregoing implementations, multiple steps or methods may be implemented by software or firmware that is stored in a memory and that is executed by an appropriate execution system. For example, if the parts of this application are implemented by hardware, identical to another implementation, any one or a combination of the following technologies may be used for implementation: a discrete logical circuit having a logical gate circuit for implementing a logical function for data signals, a special-purpose integrated circuit having an appropriate combined logical gate circuit, a programmable gate array (PGA), a field programmable gate array (FPGA), and so on.

A person of ordinary skill in the art may understand that all or some of the processes of the methods in the embodiments may be implemented by a computer program instructing relevant hardware. The program may be stored in a non-transitory computer-readable storage medium. When the program is executed by suitable processing circuitry, the processes of the methods in the embodiments are performed. In addition, functional modules or units in the embodiments of the present disclosure may be integrated into one processing unit, or each of the modules or units may exist alone physically, or two or more modules or units may be integrated into one unit. The integrated module may be implemented in the form of hardware, or may be implemented in the form of a software functional module. When the integrated module is implemented in the form of a software functional module and sold or used as an independent product, the integrated unit may be stored in a computer readable storage medium. The storage medium may be a magnetic disk, an optical disc, a ROM, or a RAM.

Disclosed above are merely exemplary embodiments of this application, and the scope of the claims of this application should not be limited thereto. Therefore, equivalent changes made according to the claims of this application still within the scope of this application.

What is claimed is:

1. A bullet screen content processing method, comprising:
   obtaining bullet screen content from a user terminal in association with currently played multimedia data;
   obtaining a content annotation corresponding to the bullet screen content by parsing the bullet screen content, wherein the content annotation includes at least one keyword segment corresponding to the bullet screen content;
   searching for label information corresponding to the content annotation;
   obtaining a search result based on the obtained bullet screen content and generating a result link to the search result; and
   adding, by circuitry, the bullet screen content, the label information, and the generated result link to a bullet screen data stream that is output in a movement direction across the currently played multimedia data.

2. The bullet screen content processing method according to claim 1, wherein the obtaining the content annotation corresponding to the bullet screen content by parsing the bullet screen content comprises:
   performing word segmentation processing on the bullet screen content;
   obtaining at least one character combination of the bullet screen content according to the word segmentation processing;
   performing semantic recognition processing on the at least one character combination; and
   determining the at least one keyword segment corresponding to the bullet screen content according to the semantic recognition processing.

3. The bullet screen content processing method according to claim 2, wherein
   the word segmentation processing is performed by using a preset lexicon, and
   the determining the at least one keyword segment corresponding to the bullet screen content is performed based on a preset term attribute and a segment context.

4. The bullet screen content processing method according to claim 3, wherein the searching for the label information corresponding to the content annotation comprises:
   detecting, according to the at least one keyword segment that corresponds to the bullet screen content and is included in the content annotation, whether there is preset label information corresponding to the at least one keyword segment;
   sending a label information searching request including the at least one keyword segment to a searching device when there is no preset label information corresponding to the at least one keyword segment, causing the searching device to output the search result corresponding to the at least one keyword segment; and
   obtaining the search result corresponding to the at least one keyword segment from the searching device, and extracting the label information corresponding to the content annotation from the search result.

5. The bullet screen content processing method according to claim 4, wherein the adding comprises:
   generating response information corresponding to the bullet screen content according to the result link and the label information; and
   adding the bullet screen content and the response information to the bullet screen data stream that is output in the movement direction across the currently played multimedia data.

6. The bullet screen content processing method according to claim 5, further comprising:
   obtaining a request from the user terminal for displaying the search result, when a triggering operation for the result link is detected; and
   encapsulating the search result by using a preset display format, and sending an encapsulated search result to the user terminal, causing the user terminal to display the encapsulated search result.

7. The bullet screen content processing method according to claim 6, wherein the preset display format includes a display format with a hovering, semitransparent attribute.

8. The bullet screen content processing method according to claim 1, wherein the searching for the label information corresponding to the content annotation comprises:
   searching, according to the at least one keyword segment that corresponds to the bullet screen content and is included in the content annotation, for the label information corresponding to the at least one keyword segment.

9. A non-transitory computer-readable storage medium storing computer-readable instructions, the computer-readable instructions, when executed by one or more processors of a user terminal, causing the one or more processors to perform:
   obtaining bullet screen content that is input in association with currently played multimedia data;
   sending the bullet screen content to an application server, causing the application server to obtain a content annotation corresponding to the bullet screen content by parsing the bullet screen content, search for label information corresponding to the content annotation, obtain a search result based on the obtained bullet screen content, and generate a result link to the search result, wherein the content annotation includes at least one keyword segment corresponding to the bullet screen content; and
   receiving a bullet screen data stream from the application server in association with the multimedia data, the bullet screen data stream including the bullet screen content, the label information, and the generated result link, the bullet screen data stream being output in a movement direction across the currently played multimedia data.

10. The non-transitory computer-readable storage medium according to claim 9, wherein
the bullet screen data stream that is received from the application server includes the bullet screen content and response information, and
the response information includes the label information and the result link corresponding to the search result, the search result being a result obtained by the application server by searching for the at least one keyword segment included in the content annotation, and the search result including the label information.

11. The non-transitory computer-readable storage medium according to claim 10, wherein the stored computer-readable instructions, when executed by the one or more processors, further cause the one or more processors to perform:
sending a request for displaying the search result to the application server when a triggering operation for the result link is received, causing the application server to encapsulate the search result by using a preset display format; and
receiving an encapsulated search result from the application server, and displaying the encapsulated search result,
wherein the preset display format includes a display format with a hovering, semitransparent attribute.

12. A server, comprising:
at least one processor configured to:
obtain bullet screen content from a user terminal in association with currently played multimedia data;
obtain a content annotation corresponding to the bullet screen content by parsing the bullet screen content, wherein the content annotation includes at least one keyword segment corresponding to the bullet screen content;
search for label information corresponding to the content annotation;
obtain a search result based on the obtained bullet screen content and generate a result link to the search result; and
add the bullet screen content, the label information, and the generated result link to a bullet screen data stream that is output in a movement direction across the currently played multimedia data.

13. The server according to claim 12, wherein the at least one processor is further configured to:
perform word segmentation processing on the bullet screen content;
obtain at least one character combination of the bullet screen content according to the word segmentation processing;
perform semantic recognition processing on the at least one character combination, and
determine the at least one keyword segment corresponding to the bullet screen content according to the semantic recognition processing.

14. The server according to claim 13, wherein
the word segmentation processing is performed by using a preset lexicon, and
the determining the at least one keyword segment corresponding to the bullet screen content is performed based on a preset term attribute and a segment context.

15. The server according to claim 14, wherein the at least one processor is further configured to:
detect, according to the at least one keyword segment that corresponds to the bullet screen content and is included in the content annotation, whether there is preset label information corresponding to the at least one keyword segment;
send a label information searching request including the at least one keyword segment to a searching device when there is no preset label information corresponding to the at least one keyword segment, causing the searching device to output the search result corresponding to the at least one keyword segment; and
obtain the search result corresponding to the at least one keyword segment from the searching device, and extracting the label information corresponding to the at least one keyword segment from the search result.

16. The server according to claim 15, wherein the at least one processor is further configured to:
generate response information corresponding to the bullet screen content according to the result link and the label information; and
add the bullet screen content and the response information to the bullet screen data stream that is output in the movement direction across the currently played multimedia data.

17. The server according to claim 16, wherein the at least one processor is further configured to:
obtain a request from the user terminal for displaying the search result, when a triggering operation for the result link is detected; and
encapsulate the search result by using a preset display format, and send an encapsulated search result to the user terminal, causing the user terminal to display the encapsulated search result.

18. The server according to claim 17, wherein the preset display format includes a display format with a hovering, semitransparent attribute.

19. The server according to claim 16, wherein the at least one processor is further configured to:
register an identifier for identifying an application on the user terminal;
obtain a request from the user terminal for displaying the search result, the request being associated with the identifier;
encapsulate the search result in response to the request; and
send the encapsulated search result to the user terminal according to the identifier.

20. The server according to claim 12, wherein the at least one processor is further configured to:
search, according to the at least one keyword segment that corresponds to the bullet screen content and is included in the content annotation, for the label information corresponding to the at least one keyword segment.

* * * * *